US005359424A

United States Patent [19]

Kobayashi

[11] Patent Number: 5,359,424

[45] Date of Patent: Oct. 25, 1994

[54] THERMAL TRANSFER IMAGE FORMING APPARATUS USING DIFFERENT GAMMA FUNCTIONS FOR DIFFERENT DENSITY RANGES

[75] Inventor: Takoa Kobayashi, Nagano, Japan

[73] Assignee: Seiko Epson Corporation, Tokyo, Japan

[21] Appl. No.: 893,081

[22] Filed: Jun. 3, 1992

[30] Foreign Application Priority Data

Jun. 5, 1991 [JP] Japan .................................. 3-161134
Sep. 10, 1991 [JP] Japan .................................. 3-230205
Sep. 10, 1991 [JP] Japan .................................. 3-230206
Sep. 10, 1991 [JP] Japan .................................. 3-230207

[51] Int. Cl.$^5$ ........................ H04N 1/21; G01D 15/10

[52] U.S. Cl. ................................ 358/296; 346/76 PH; 346/160; 358/459

[58] Field of Search .......................... 346/76 PH, 160; 358/298, 503, 519, 534, 536, 459, 296

[56] References Cited

U.S. PATENT DOCUMENTS 3,922,484 11/1975 Keller .................................. 358/534
4,701,811 10/1987 Moriguchi et al. ................. 358/298
4,714,964 12/1987 Sasaki .................................. 358/298
4,773,734 9/1988 Inoda .................................. 350/322
4,884,080 11/1989 Hirahara et al. ............... 346/76 PH
4,890,121 12/1989 Hirahara et al. ............... 346/76 PH
4,952,085 8/1990 Rein .............................. 346/76 PH
5,182,575 1/1993 Kato et al. ............................ 346/108
5,210,545 5/1993 Tomita .................................. 346/1.1

FOREIGN PATENT DOCUMENTS 0240202 10/1987 European Pat. Off. .

*Primary Examiner*—Benjamin R. Fuller
*Assistant Examiner*—Randy W. Gibson
*Attorney, Agent, or Firm*—Sughrue, Mion, Zinn, Macpeak & Seas

[57] ABSTRACT

A thermal transfer image forming apparatus comprises: a recording head having a plurality of heating resistor elements arranged in a line; a mechanism for carrying a sheet of recording paper and an ink sheet at a predetermined pitch; a microcomputer including an image data reading means for continuously reading N-lines' pixel data (N being an integer of $N \geqq 2$) constituting input pixel data, a sampling means for sampling the N-lines' pixel data to a matrix of $N \geqq N$ pixels, a gamma conversion means having a first gamma characteristic conversion function for outputting print data to form main dots by performing gamma conversion proportionally in a range of from a low density to a high density, a second gamma characteristic conversion function for outputting print data being lower in density than the first gamma characteristic conversion function to form subsidiary dots, and third and fourth gamma characteristic conversion functions to form no dot in a large part of the density range, to thereby express the pixel density as dot size for each of the $N \times N$ pixels, and a conversion characteristic selection means for assigning the gamma characteristic conversion functions to the sampled $N \times N$ pixels to arrange dots based on the first gamma characteristic conversion function at a predetermined angle; and a drive circuit for supplying electric energy corresponding to the print data to the heating resistor elements of the recording head.

9 Claims, 30 Drawing Sheets

FIG. 9(III)
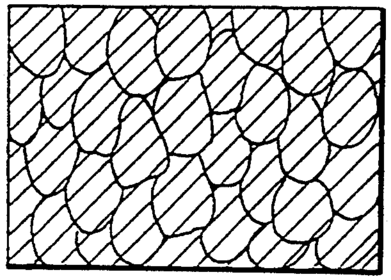

FIG. 12(III)
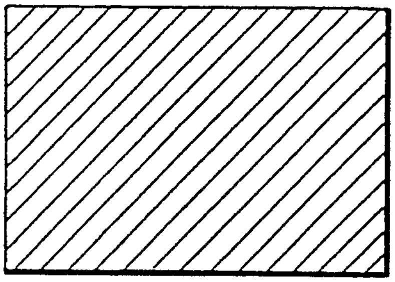

FIG. 13

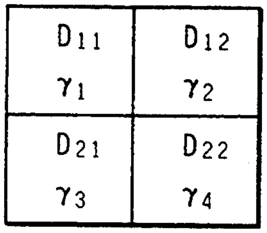

FIG. 14

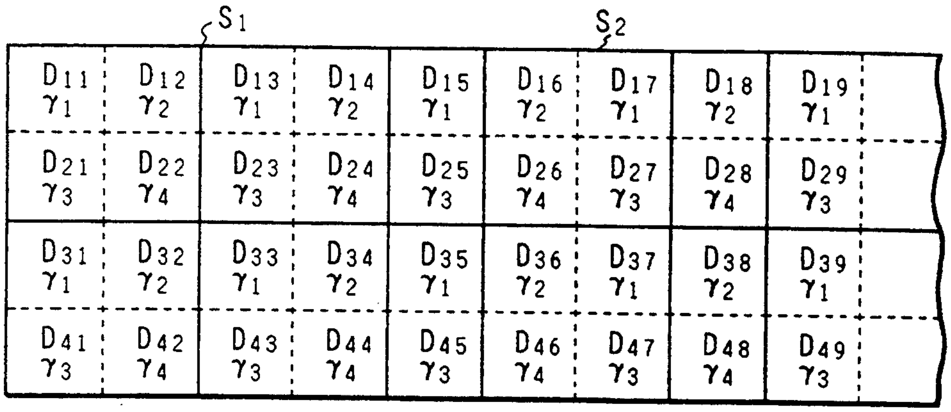

FIG. 15(I)

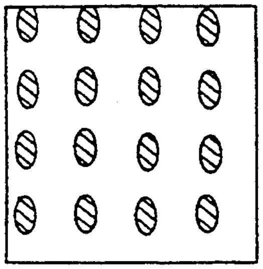

FIG. 15(II)

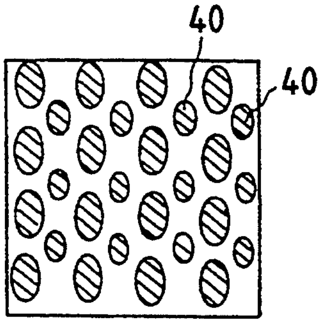

FIG. 15(III)

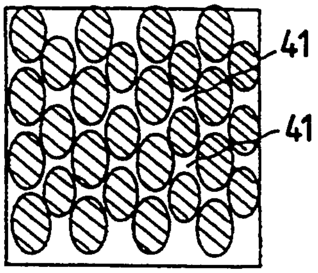

FIG. 15(IV)

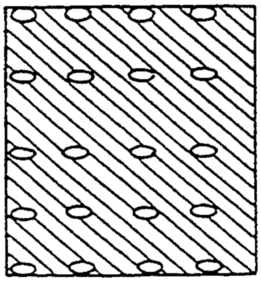

FIG. 15(V)

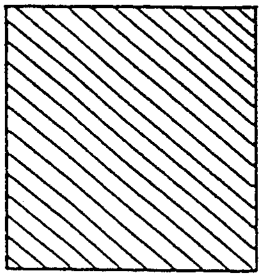

| $D_{11}$ $\gamma_1$ | $D_{12}$ $\gamma_2$ |
|---|---|
| $D_{21}$ $\gamma_3$ | $D_{22}$ $\gamma_4$ |

| $D_{11}$ $\gamma_1$ | $D_{12}$ $\gamma_2$ | $D_{13}$ $\gamma_1$ | $D_{14}$ $\gamma_2$ | $D_{15}$ $\gamma_1$ | $D_{16}$ $\gamma_2$ | $D_{17}$ $\gamma_1$ | $D_{18}$ $\gamma_2$ | $D_{19}$ $\gamma_1$ |
|---|---|---|---|---|---|---|---|---|
| $D_{21}$ $\gamma_3$ | $D_{22}$ $\gamma_4$ | $D_{23}$ $\gamma_3$ | $D_{24}$ $\gamma_4$ | $D_{25}$ $\gamma_3$ | $D_{26}$ $\gamma_4$ | $D_{27}$ $\gamma_3$ | $D_{28}$ $\gamma_4$ | $D_{29}$ $\gamma_3$ |
| $D_{31}$ $\gamma_1$ | $D_{32}$ $\gamma_2$ | $D_{33}$ $\gamma_1$ | $D_{34}$ $\gamma_2$ | $D_{35}$ $\gamma_1$ | $D_{36}$ $\gamma_2$ | $D_{37}$ $\gamma_1$ | $D_{38}$ $\gamma_2$ | $D_{39}$ $\gamma_1$ |
| $D_{41}$ $\gamma_3$ | $D_{42}$ $\gamma_4$ | $D_{43}$ $\gamma_3$ | $D_{44}$ $\gamma_4$ | $D_{45}$ $\gamma_3$ | $D_{46}$ $\gamma_4$ | $D_{47}$ $\gamma_3$ | $D_{48}$ $\gamma_4$ | $D_{49}$ $\gamma_3$ |

Columns grouped: $S_1$, $S_2$

FIG. 16

| | |
|---|---|
| $D_{11}$ $\gamma_1$ | $D_{12}$ $\gamma_3$ |
| $D_{21}$ $\gamma_4$ | $D_{22}$ $\gamma_2$ |

| | | | | | | | | | |
|---|---|---|---|---|---|---|---|---|---|
| $D_{11}$ $\gamma_1$ | $D_{12}$ $\gamma_3$ | $D_{13}$ $\gamma_1$ | $D_{14}$ $\gamma_3$ | $D_{15}$ $\gamma_1$ | $D_{16}$ $\gamma_3$ | $D_{17}$ $\gamma_1$ | $D_{18}$ $\gamma_3$ | $D_{19}$ $\gamma_1$ | |
| $D_{21}$ $\gamma_4$ | $D_{22}$ $\gamma_2$ | $D_{23}$ $\gamma_4$ | $D_{24}$ $\gamma_2$ | $D_{25}$ $\gamma_4$ | $D_{26}$ $\gamma_2$ | $D_{27}$ $\gamma_4$ | $D_{28}$ $\gamma_2$ | $D_{29}$ $\gamma_4$ | |
| $D_{31}$ $\gamma_3$ | $D_{32}$ $\gamma_1$ | $D_{33}$ $\gamma_3$ | $D_{34}$ $\gamma_1$ | $D_{35}$ $\gamma_3$ | $D_{36}$ $\gamma_1$ | $D_{37}$ $\gamma_3$ | $D_{38}$ $\gamma_1$ | $D_{39}$ $\gamma_3$ | |
| $D_{41}$ $\gamma_2$ | $D_{42}$ $\gamma_4$ | $D_{43}$ $\gamma_2$ | $D_{44}$ $\gamma_4$ | $D_{45}$ $\gamma_2$ | $D_{46}$ $\gamma_4$ | $D_{47}$ $\gamma_2$ | $D_{48}$ $\gamma_4$ | $D_{49}$ $\gamma_2$ | |

FIG. 18(I)

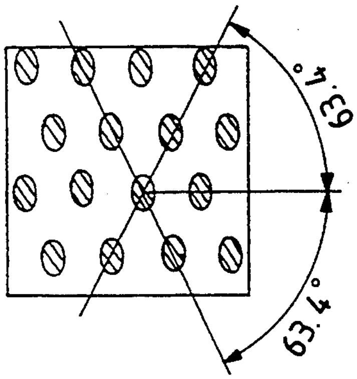

FIG. 18(II)

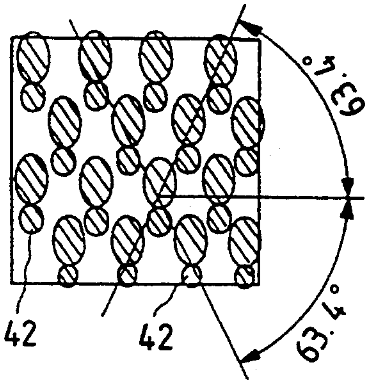

FIG. 18(III)

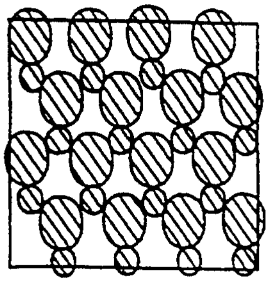

FIG. 18(IV)

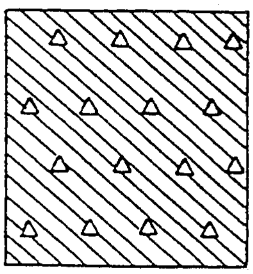

FIG. 18(V)

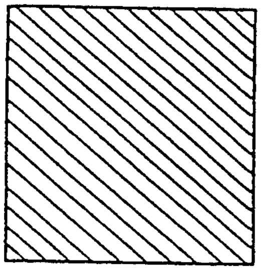

FIG. 19(a)

| | |
|---|---|
| $D_{11}$ $\gamma_4$ | $D_{12}$ $\gamma_1$ |
| $D_{21}$ $\gamma_3$ | $D_{22}$ $\gamma_2$ |

FIG. 19(b)

| | |
|---|---|
| $D_{11}$ $\gamma_3$ | $D_{12}$ $\gamma_2$ |
| $D_{21}$ $\gamma_4$ | $D_{22}$ $\gamma_1$ |

| | | | | | | | | |
|---|---|---|---|---|---|---|---|---|
| $D_{11}$ $\gamma_4$ | $D_{12}$ $\gamma_1$ | $D_{13}$ $\gamma_3$ | $D_{14}$ $\gamma_2$ | $D_{15}$ $\gamma_4$ | $D_{16}$ $\gamma_1$ | $D_{17}$ $\gamma_3$ | $D_{18}$ $\gamma_2$ | $D_{19}$ $\gamma_4$ |
| $D_{21}$ $\gamma_3$ | $D_{22}$ $\gamma_2$ | $D_{23}$ $\gamma_4$ | $D_{24}$ $\gamma_1$ | $D_{25}$ $\gamma_3$ | $D_{26}$ $\gamma_2$ | $D_{27}$ $\gamma_4$ | $D_{28}$ $\gamma_1$ | $D_{29}$ $\gamma_3$ |
| $D_{31}$ $\gamma_4$ | $D_{32}$ $\gamma_1$ | $D_{33}$ $\gamma_3$ | $D_{34}$ $\gamma_2$ | $D_{35}$ $\gamma_4$ | $D_{36}$ $\gamma_1$ | $D_{37}$ $\gamma_3$ | $D_{38}$ $\gamma_2$ | $D_{39}$ $\gamma_4$ |
| $D_{41}$ $\gamma_3$ | $D_{42}$ $\gamma_2$ | $D_{43}$ $\gamma_4$ | $D_{44}$ $\gamma_1$ | $D_{45}$ $\gamma_3$ | $D_{46}$ $\gamma_2$ | $D_{47}$ $\gamma_4$ | $D_{48}$ $\gamma_1$ | $D_{49}$ $\gamma_3$ |

FIG. 21(I)

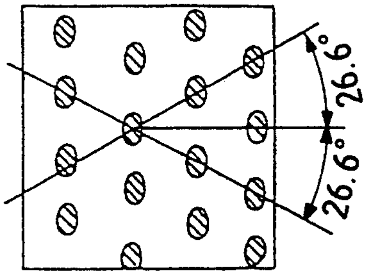

FIG. 21(II)

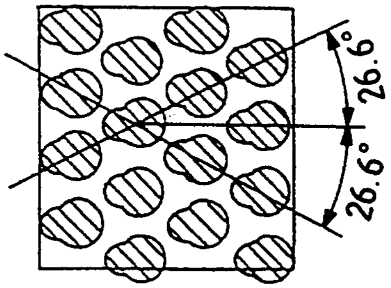

FIG. 21(III)

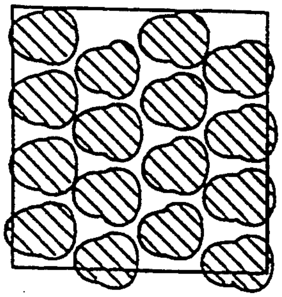

FIG. 21(IV)

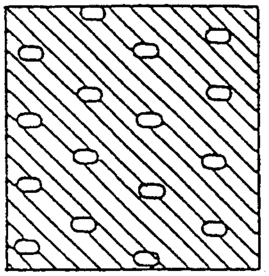

FIG. 21(V)

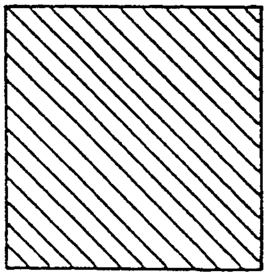

FIG. 22(a)

| | |
|---|---|
| $D_{11}$ $\gamma_1$ | $D_{12}$ $\gamma_2$ |
| $D_{21}$ $\gamma_3$ | $D_{22}$ $\gamma_4$ |

FIG. 22(b)

| | |
|---|---|
| $D_{11}$ $\gamma_4$ | $D_{12}$ $\gamma_3$ |
| $D_{21}$ $\gamma_2$ | $D_{22}$ $\gamma_1$ |

| | | | | | | | | |
|---|---|---|---|---|---|---|---|---|
| $D_{11}$ $\gamma_1$ | $D_{12}$ $\gamma_2$ | $D_{13}$ $\gamma_4$ | $D_{14}$ $\gamma_3$ | $D_{15}$ $\gamma_1$ | $D_{16}$ $\gamma_2$ | $D_{17}$ $\gamma_4$ | $D_{18}$ $\gamma_3$ | $D_{19}$ $\gamma_1$ |
| $D_{21}$ $\gamma_3$ | $D_{22}$ $\gamma_4$ | $D_{23}$ $\gamma_2$ | $D_{24}$ $\gamma_1$ | $D_{25}$ $\gamma_3$ | $D_{26}$ $\gamma_4$ | $D_{27}$ $\gamma_2$ | $D_{28}$ $\gamma_1$ | $D_{29}$ $\gamma_3$ |
| $D_{31}$ $\gamma_4$ | $D_{32}$ $\gamma_3$ | $D_{33}$ $\gamma_1$ | $D_{34}$ $\gamma_2$ | $D_{35}$ $\gamma_4$ | $D_{36}$ $\gamma_3$ | $D_{37}$ $\gamma_1$ | $D_{38}$ $\gamma_2$ | $D_{39}$ $\gamma_4$ |
| $D_{41}$ $\gamma_2$ | $D_{42}$ $\gamma_1$ | $D_{43}$ $\gamma_3$ | $D_{44}$ $\gamma_4$ | $D_{45}$ $\gamma_2$ | $D_{46}$ $\gamma_1$ | $D_{47}$ $\gamma_3$ | $D_{48}$ $\gamma_4$ | $D_{49}$ $\gamma_2$ |

FIG. 24(I)

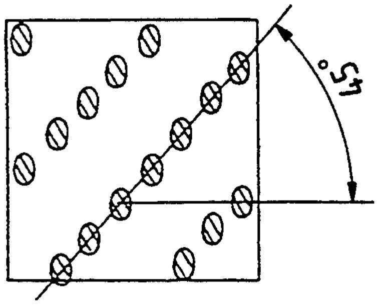

FIG. 24(II)

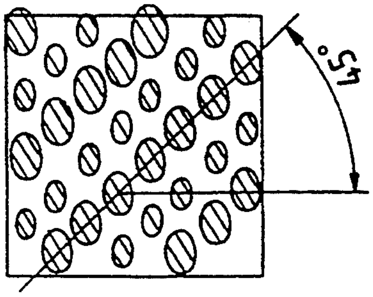

FIG. 24(III)

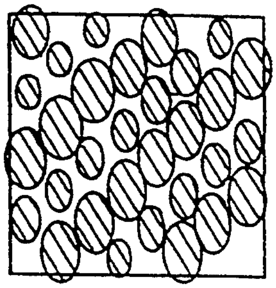

FIG. 24(IV)

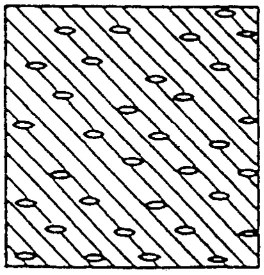

FIG. 24(V)

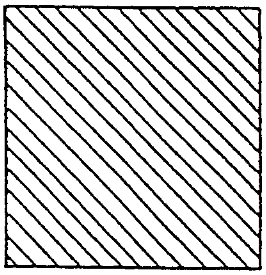

FIG. 25(a)

| | |
|---|---|
| $D_{11}$ $\gamma_2$ | $D_{12}$ $\gamma_4$ |
| $D_{21}$ $\gamma_1$ | $D_{22}$ $\gamma_3$ |

FIG. 25(b)

| | |
|---|---|
| $D_{11}$ $\gamma_3$ | $D_{12}$ $\gamma_1$ |
| $D_{21}$ $\gamma_4$ | $D_{22}$ $\gamma_2$ |

| | | | | | | | | |
|---|---|---|---|---|---|---|---|---|
| $D_{11}$ $\gamma_2$ | $D_{12}$ $\gamma_4$ | $D_{13}$ $\gamma_3$ | $D_{14}$ $\gamma_1$ | $D_{15}$ $\gamma_2$ | $D_{16}$ $\gamma_4$ | $D_{17}$ $\gamma_3$ | $D_{18}$ $\gamma_1$ | $D_{19}$ $\gamma_2$ |
| $D_{21}$ $\gamma_1$ | $D_{22}$ $\gamma_3$ | $D_{23}$ $\gamma_4$ | $D_{24}$ $\gamma_2$ | $D_{25}$ $\gamma_1$ | $D_{26}$ $\gamma_3$ | $D_{27}$ $\gamma_4$ | $D_{28}$ $\gamma_2$ | $D_{29}$ $\gamma_1$ |
| $D_{31}$ $\gamma_3$ | $D_{32}$ $\gamma_1$ | $D_{33}$ $\gamma_2$ | $D_{34}$ $\gamma_4$ | $D_{35}$ $\gamma_3$ | $D_{36}$ $\gamma_1$ | $D_{37}$ $\gamma_2$ | $D_{38}$ $\gamma_4$ | $D_{39}$ $\gamma_3$ |
| $D_{41}$ $\gamma_4$ | $D_{42}$ $\gamma_2$ | $D_{43}$ $\gamma_1$ | $D_{44}$ $\gamma_3$ | $D_{45}$ $\gamma_4$ | $D_{46}$ $\gamma_2$ | $D_{47}$ $\gamma_1$ | $D_{48}$ $\gamma_3$ | $D_{49}$ $\gamma_4$ |

FIG. 27(I)

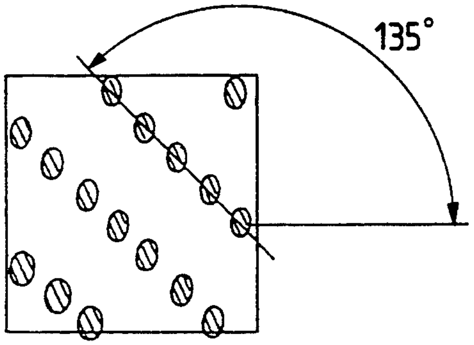

FIG. 27(II)

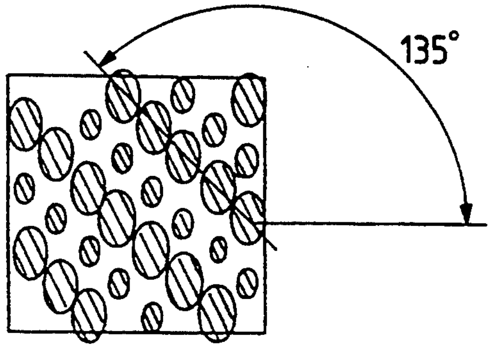

FIG. 27(III)

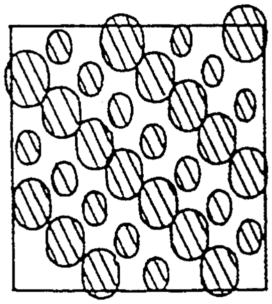

FIG. 27(IV)

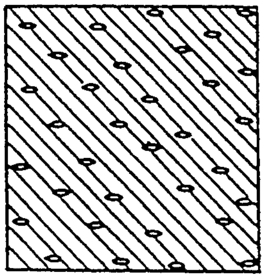

FIG. 27(V)

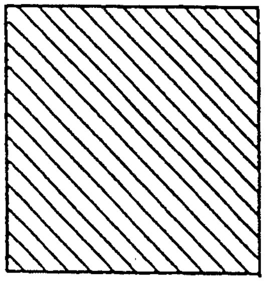

FIG. 29(III)
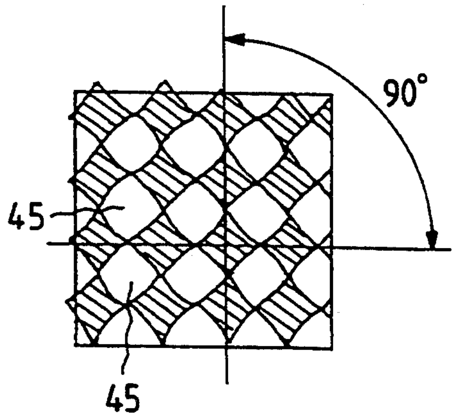

FIG. 37

| | |
|---|---|
| $D_{11}$ $\gamma_{11}$ | $D_{12}$ $\gamma_{33}$ |
| $D_{21}$ $\gamma_{34}$ | $D_{22}$ $\gamma_{21}$ |

| | | | | | | | | | |
|---|---|---|---|---|---|---|---|---|---|
| $D_{11}$ $\gamma_{11}$ | $D_{12}$ $\gamma_{33}$ | $D_{13}$ $\gamma_{13}$ | $D_{14}$ $\gamma_{31}$ | $D_{15}$ $\gamma_{11}$ | $D_{16}$ $\gamma_{33}$ | $D_{17}$ $\gamma_{13}$ | $D_{18}$ $\gamma_{31}$ | $D_{19}$ $\gamma_{11}$ | |
| $D_{21}$ $\gamma_{34}$ | $D_{22}$ $\gamma_{21}$ | $D_{23}$ $\gamma_{34}$ | $D_{24}$ $\gamma_{24}$ | $D_{25}$ $\gamma_{34}$ | $D_{26}$ $\gamma_{21}$ | $D_{27}$ $\gamma_{34}$ | $D_{28}$ $\gamma_{24}$ | $D_{29}$ $\gamma_{34}$ | |
| $D_{31}$ $\gamma_{14}$ | $D_{32}$ $\gamma_{31}$ | $D_{33}$ $\gamma_{12}$ | $D_{34}$ $\gamma_{32}$ | $D_{35}$ $\gamma_{14}$ | $D_{36}$ $\gamma_{31}$ | $D_{37}$ $\gamma_{12}$ | $D_{38}$ $\gamma_{32}$ | $D_{39}$ $\gamma_{14}$ | |
| $D_{41}$ $\gamma_{34}$ | $D_{42}$ $\gamma_{23}$ | $D_{43}$ $\gamma_{34}$ | $D_{44}$ $\gamma_{22}$ | $D_{45}$ $\gamma_{34}$ | $D_{46}$ $\gamma_{23}$ | $D_{47}$ $\gamma_{34}$ | $D_{48}$ $\gamma_{22}$ | $D_{49}$ $\gamma_{34}$ | |

FIG. 39(I)

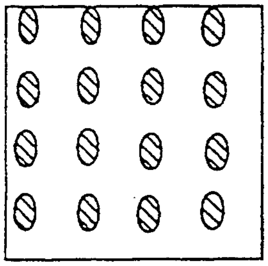

FIG. 39(II)

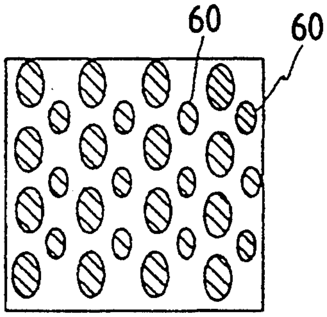

FIG. 39(III)

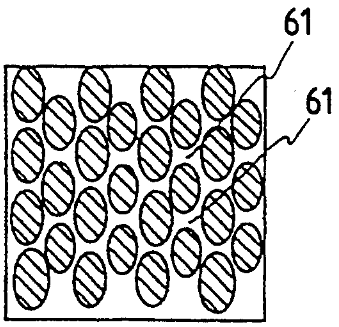

FIG. 39(IV)

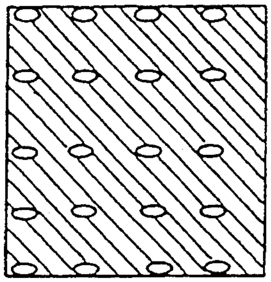

FIG. 39(V)

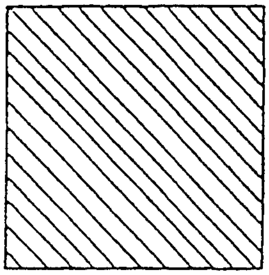

FIG. 40

| | |
|---|---|
| $D_{11}$ $\gamma_{11}$ | $D_{12}$ $\gamma_{34}$ |
| $D_{21}$ $\gamma_{21}$ | $D_{22}$ $\gamma_{33}$ |

| | | | | | | | | |
|---|---|---|---|---|---|---|---|---|
| $D_{11}$ $\gamma_{11}$ | $D_{12}$ $\gamma_{34}$ | $D_{13}$ $\gamma_{13}$ | $D_{14}$ $\gamma_{34}$ | $D_{15}$ $\gamma_{11}$ | $D_{16}$ $\gamma_{34}$ | $D_{17}$ $\gamma_{13}$ | $D_{18}$ $\gamma_{34}$ | $D_{19}$ $\gamma_{11}$ |
| $D_{21}$ $\gamma_{21}$ | $D_{22}$ $\gamma_{33}$ | $D_{23}$ $\gamma_{23}$ | $D_{24}$ $\gamma_{31}$ | $D_{25}$ $\gamma_{21}$ | $D_{26}$ $\gamma_{33}$ | $D_{27}$ $\gamma_{23}$ | $D_{28}$ $\gamma_{31}$ | $D_{29}$ $\gamma_{21}$ |
| $D_{31}$ $\gamma_{34}$ | $D_{32}$ $\gamma_{14}$ | $D_{33}$ $\gamma_{34}$ | $D_{34}$ $\gamma_{12}$ | $D_{35}$ $\gamma_{34}$ | $D_{36}$ $\gamma_{14}$ | $D_{37}$ $\gamma_{34}$ | $D_{38}$ $\gamma_{12}$ | $D_{39}$ $\gamma_{34}$ |
| $D_{41}$ $\gamma_{31}$ | $D_{42}$ $\gamma_{24}$ | $D_{43}$ $\gamma_{32}$ | $D_{44}$ $\gamma_{22}$ | $D_{45}$ $\gamma_{31}$ | $D_{46}$ $\gamma_{24}$ | $D_{47}$ $\gamma_{32}$ | $D_{48}$ $\gamma_{22}$ | $D_{49}$ $\gamma_{31}$ |

FIG. 42(I)

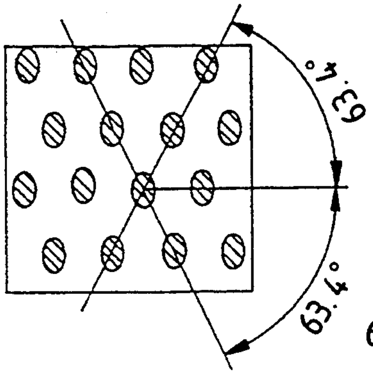

FIG. 42(II)

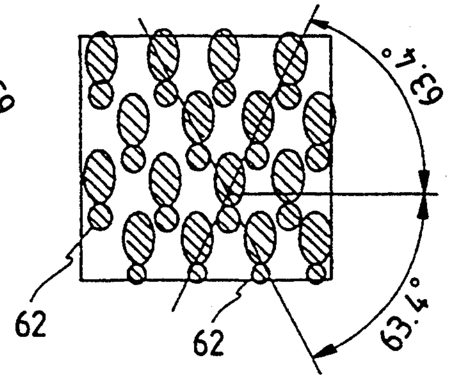

FIG. 42(III)

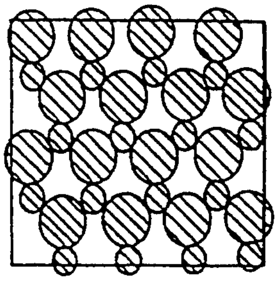

FIG. 42(IV)

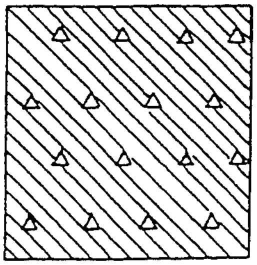

FIG. 42(V)

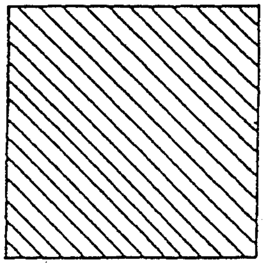

FIG. 43(a)

| | |
|---|---|
| $D_{11}$ $\gamma_{41}$ | $D_{12}$ $\gamma_{11}$ |
| $D_{21}$ $\gamma_{33}$ | $D_{22}$ $\gamma_{34}$ |

FIG. 43(b)

| | |
|---|---|
| $D_{13}$ $\gamma_{33}$ | $D_{14}$ $\gamma_{34}$ |
| $D_{23}$ $\gamma_{44}$ | $D_{24}$ $\gamma_{14}$ |

| | | | | | | | | |
|---|---|---|---|---|---|---|---|---|
| $D_{11}$ $\gamma_{41}$ | $D_{12}$ $\gamma_{11}$ | $D_{13}$ $\gamma_{33}$ | $D_{14}$ $\gamma_{34}$ | $D_{15}$ $\gamma_{41}$ | $D_{16}$ $\gamma_{11}$ | $D_{17}$ $\gamma_{33}$ | $D_{18}$ $\gamma_{34}$ | $D_{19}$ $\gamma_{41}$ |
| $D_{21}$ $\gamma_{33}$ | $D_{22}$ $\gamma_{34}$ | $D_{23}$ $\gamma_{44}$ | $D_{24}$ $\gamma_{14}$ | $D_{25}$ $\gamma_{33}$ | $D_{26}$ $\gamma_{34}$ | $D_{27}$ $\gamma_{44}$ | $D_{28}$ $\gamma_{14}$ | $D_{29}$ $\gamma_{33}$ |
| $D_{31}$ $\gamma_{43}$ | $D_{32}$ $\gamma_{13}$ | $D_{33}$ $\gamma_{31}$ | $D_{34}$ $\gamma_{34}$ | $D_{35}$ $\gamma_{43}$ | $D_{36}$ $\gamma_{13}$ | $D_{37}$ $\gamma_{31}$ | $D_{38}$ $\gamma_{34}$ | $D_{39}$ $\gamma_{43}$ |
| $D_{41}$ $\gamma_{32}$ | $D_{42}$ $\gamma_{34}$ | $D_{43}$ $\gamma_{42}$ | $D_{44}$ $\gamma_{12}$ | $D_{45}$ $\gamma_{32}$ | $D_{46}$ $\gamma_{34}$ | $D_{47}$ $\gamma_{42}$ | $D_{48}$ $\gamma_{12}$ | $D_{49}$ $\gamma_{32}$ |

FIG. 45(I)

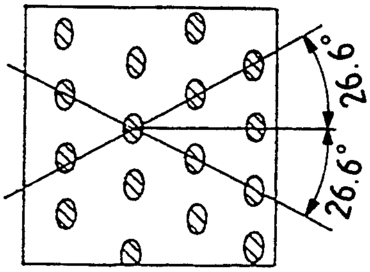

FIG. 45(II)

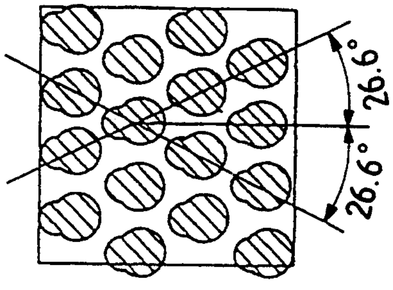

FIG. 45(III)

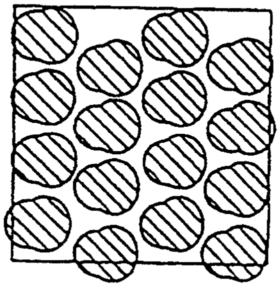

FIG. 45(IV)

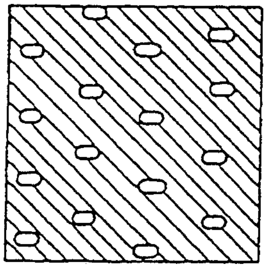

FIG. 45(V)

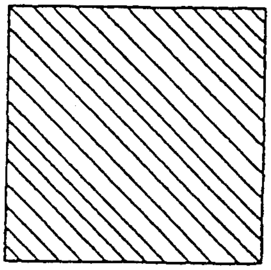

FIG. 46(a)

| | |
|---|---|
| $D_{11}$ $\gamma_{11}$ | $D_{12}$ $\gamma_{33}$ |
| $D_{21}$ $\gamma_{34}$ | $D_{22}$ $\gamma_{21}$ |

FIG. 46(b)

| | |
|---|---|
| $D_{13}$ $\gamma_{24}$ | $D_{14}$ $\gamma_{34}$ |
| $D_{23}$ $\gamma_{31}$ | $D_{24}$ $\gamma_{14}$ |

| | | | | | | | | |
|---|---|---|---|---|---|---|---|---|
| $D_{11}$ $\gamma_{11}$ | $D_{12}$ $\gamma_{33}$ | $D_{13}$ $\gamma_{24}$ | $D_{14}$ $\gamma_{34}$ | $D_{15}$ $\gamma_{11}$ | $D_{16}$ $\gamma_{33}$ | $D_{17}$ $\gamma_{24}$ | $D_{18}$ $\gamma_{34}$ | $D_{19}$ $\gamma_{11}$ |
| $D_{21}$ $\gamma_{34}$ | $D_{22}$ $\gamma_{21}$ | $D_{23}$ $\gamma_{31}$ | $D_{24}$ $\gamma_{14}$ | $D_{25}$ $\gamma_{34}$ | $D_{26}$ $\gamma_{21}$ | $D_{27}$ $\gamma_{31}$ | $D_{28}$ $\gamma_{14}$ | $D_{29}$ $\gamma_{34}$ |
| $D_{31}$ $\gamma_{23}$ | $D_{32}$ $\gamma_{34}$ | $D_{33}$ $\gamma_{12}$ | $D_{34}$ $\gamma_{32}$ | $D_{35}$ $\gamma_{23}$ | $D_{36}$ $\gamma_{34}$ | $D_{37}$ $\gamma_{12}$ | $D_{38}$ $\gamma_{32}$ | $D_{39}$ $\gamma_{23}$ |
| $D_{41}$ $\gamma_{32}$ | $D_{42}$ $\gamma_{13}$ | $D_{43}$ $\gamma_{34}$ | $D_{44}$ $\gamma_{22}$ | $D_{45}$ $\gamma_{32}$ | $D_{46}$ $\gamma_{13}$ | $D_{47}$ $\gamma_{34}$ | $D_{48}$ $\gamma_{22}$ | $D_{49}$ $\gamma_{32}$ |

FIG. 48(I)

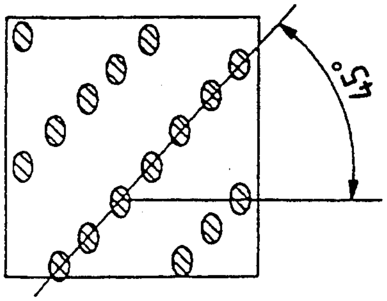

FIG. 48(II)

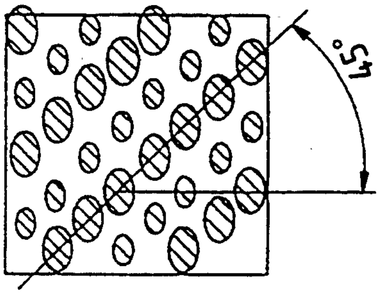

FIG. 48(III)

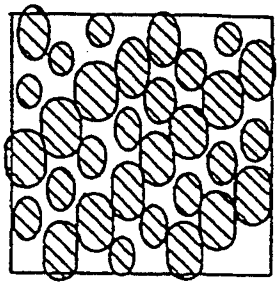

FIG. 48(IV)

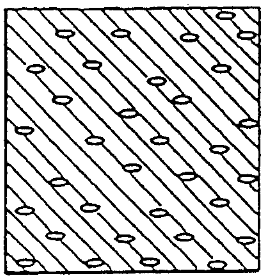

FIG. 48(V)

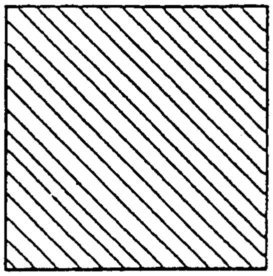

FIG. 49(a)

| | |
|---|---|
| $D_{11}$ $\gamma_{34}$ | $D_{12}$ $\gamma_{21}$ |
| $D_{21}$ $\gamma_{11}$ | $D_{22}$ $\gamma_{33}$ |

FIG. 49(b)

| | |
|---|---|
| $D_{13}$ $\gamma_{31}$ | $D_{14}$ $\gamma_{14}$ |
| $D_{23}$ $\gamma_{24}$ | $D_{24}$ $\gamma_{34}$ |

| | | | | | | | | |
|---|---|---|---|---|---|---|---|---|
| $D_{11}$ $\gamma_{34}$ | $D_{12}$ $\gamma_{21}$ | $D_{13}$ $\gamma_{31}$ | $D_{14}$ $\gamma_{14}$ | $D_{15}$ $\gamma_{34}$ | $D_{16}$ $\gamma_{21}$ | $D_{17}$ $\gamma_{31}$ | $D_{18}$ $\gamma_{14}$ | $D_{19}$ $\gamma_{34}$ |
| $D_{21}$ $\gamma_{11}$ | $D_{22}$ $\gamma_{33}$ | $D_{23}$ $\gamma_{24}$ | $D_{24}$ $\gamma_{34}$ | $D_{25}$ $\gamma_{11}$ | $D_{26}$ $\gamma_{33}$ | $D_{27}$ $\gamma_{24}$ | $D_{28}$ $\gamma_{34}$ | $D_{29}$ $\gamma_{11}$ |
| $D_{31}$ $\gamma_{32}$ | $D_{32}$ $\gamma_{13}$ | $D_{33}$ $\gamma_{34}$ | $D_{34}$ $\gamma_{22}$ | $D_{35}$ $\gamma_{32}$ | $D_{36}$ $\gamma_{13}$ | $D_{37}$ $\gamma_{34}$ | $D_{38}$ $\gamma_{22}$ | $D_{39}$ $\gamma_{32}$ |
| $D_{41}$ $\gamma_{23}$ | $D_{42}$ $\gamma_{34}$ | $D_{43}$ $\gamma_{12}$ | $D_{44}$ $\gamma_{32}$ | $D_{45}$ $\gamma_{23}$ | $D_{46}$ $\gamma_{34}$ | $D_{47}$ $\gamma_{12}$ | $D_{48}$ $\gamma_{32}$ | $D_{49}$ $\gamma_{23}$ |

FIG. 51(I)

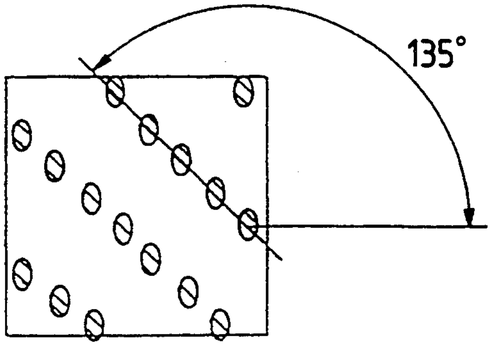

FIG. 51(II)

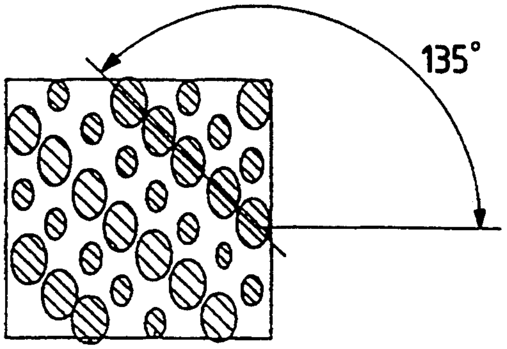

FIG. 51(III)

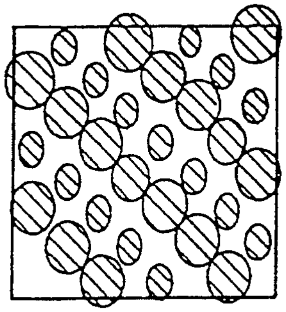

FIG. 51(IV)

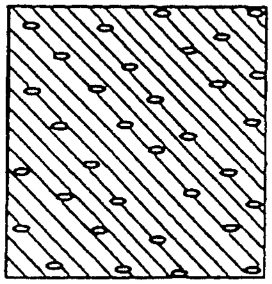

FIG. 51(V)

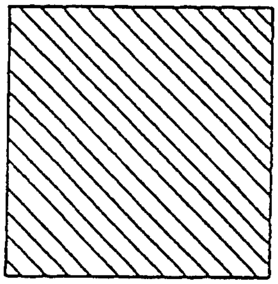

FIG. 54

| | |
|---|---|
| $D_{11}$ $\gamma_{11}$ | $D_{12}$ $\gamma_{64}$ |
| $D_{21}$ $\gamma_{51}$ | $D_{22}$ $\gamma_{34}$ |

| | | | | | | | | |
|---|---|---|---|---|---|---|---|---|
| $D_{11}$ $\gamma_{11}$ | $D_{12}$ $\gamma_{64}$ | $D_{13}$ $\gamma_{13}$ | $D_{14}$ $\gamma_{62}$ | $D_{15}$ $\gamma_{11}$ | $D_{16}$ $\gamma_{64}$ | $D_{17}$ $\gamma_{13}$ | $D_{18}$ $\gamma_{62}$ | $D_{19}$ $\gamma_{11}$ |
| $D_{21}$ $\gamma_{51}$ | $D_{22}$ $\gamma_{34}$ | $D_{23}$ $\gamma_{53}$ | $D_{24}$ $\gamma_{34}$ | $D_{25}$ $\gamma_{51}$ | $D_{26}$ $\gamma_{34}$ | $D_{27}$ $\gamma_{43}$ | $D_{28}$ $\gamma_{34}$ | $D_{29}$ $\gamma_{51}$ |
| $D_{31}$ $\gamma_{14}$ | $D_{32}$ $\gamma_{61}$ | $D_{33}$ $\gamma_{12}$ | $D_{34}$ $\gamma_{63}$ | $D_{35}$ $\gamma_{14}$ | $D_{36}$ $\gamma_{61}$ | $D_{37}$ $\gamma_{12}$ | $D_{38}$ $\gamma_{63}$ | $D_{39}$ $\gamma_{14}$ |
| $D_{41}$ $\gamma_{54}$ | $D_{42}$ $\gamma_{34}$ | $D_{43}$ $\gamma_{52}$ | $D_{44}$ $\gamma_{34}$ | $D_{45}$ $\gamma_{54}$ | $D_{46}$ $\gamma_{34}$ | $D_{47}$ $\gamma_{52}$ | $D_{48}$ $\gamma_{34}$ | $D_{49}$ $\gamma_{54}$ |

FIG. 56(I)

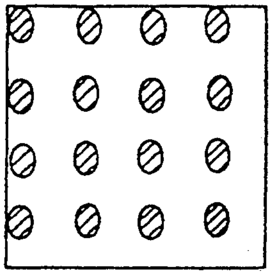

FIG. 56(II)

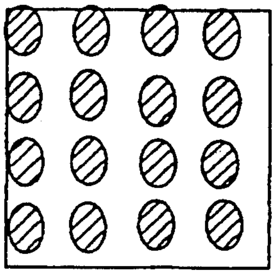

FIG. 56(III)

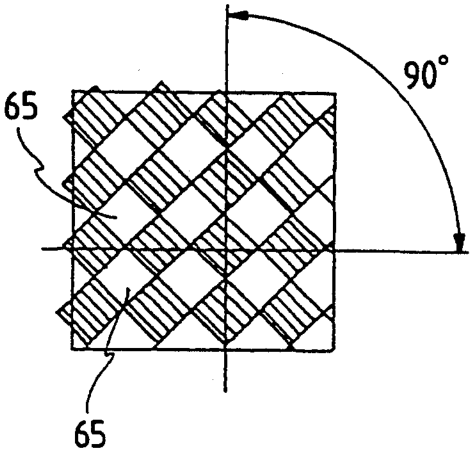

FIG. 56(IV)

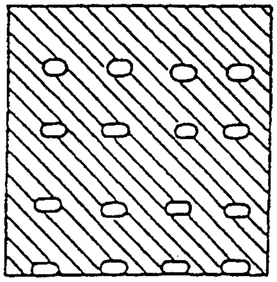

FIG. 56(V)

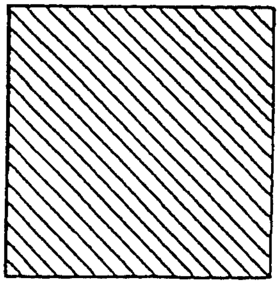

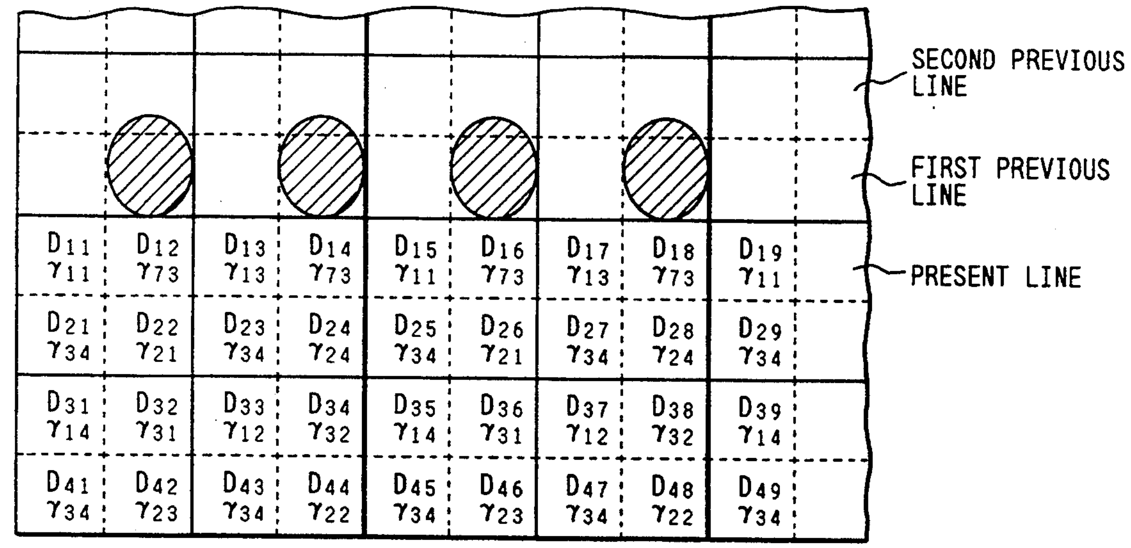

FIG. 60

|  |  |  |  |  |  |  |  |  |  |
|---|---|---|---|---|---|---|---|---|---|
| $D_{11}$ $\gamma_{11}$ | $D_{12}$ $\gamma_{73}$ | $D_{13}$ $\gamma_{13}$ | $D_{14}$ $\gamma_{73}$ | $D_{15}$ $\gamma_{11}$ | $D_{16}$ $\gamma_{73}$ | $D_{17}$ $\gamma_{13}$ | $D_{18}$ $\gamma_{73}$ | $D_{19}$ $\gamma_{11}$ | ← PRESENT LINE |
| $D_{21}$ $\gamma_{34}$ | $D_{22}$ $\gamma_{21}$ | $D_{23}$ $\gamma_{34}$ | $D_{24}$ $\gamma_{24}$ | $D_{25}$ $\gamma_{34}$ | $D_{26}$ $\gamma_{21}$ | $D_{27}$ $\gamma_{34}$ | $D_{28}$ $\gamma_{24}$ | $D_{29}$ $\gamma_{34}$ | |
| $D_{31}$ $\gamma_{14}$ | $D_{32}$ $\gamma_{31}$ | $D_{33}$ $\gamma_{12}$ | $D_{34}$ $\gamma_{32}$ | $D_{35}$ $\gamma_{14}$ | $D_{36}$ $\gamma_{31}$ | $D_{37}$ $\gamma_{12}$ | $D_{38}$ $\gamma_{32}$ | $D_{39}$ $\gamma_{14}$ | |
| $D_{41}$ $\gamma_{34}$ | $D_{42}$ $\gamma_{23}$ | $D_{43}$ $\gamma_{34}$ | $D_{44}$ $\gamma_{22}$ | $D_{45}$ $\gamma_{34}$ | $D_{46}$ $\gamma_{23}$ | $D_{47}$ $\gamma_{34}$ | $D_{48}$ $\gamma_{22}$ | $D_{49}$ $\gamma_{34}$ | |

SECOND PREVIOUS LINE
FIRST PREVIOUS LINE

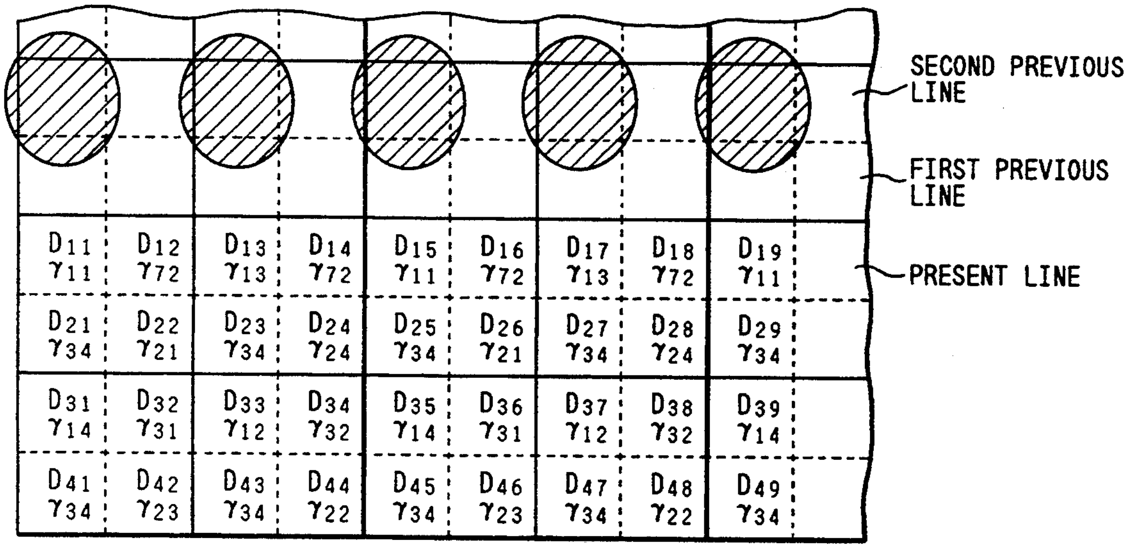

FIG. 61

|  |  |  |  |  |  |  |  |  |  |
|---|---|---|---|---|---|---|---|---|---|
| $D_{11}$ $\gamma_{11}$ | $D_{12}$ $\gamma_{72}$ | $D_{13}$ $\gamma_{13}$ | $D_{14}$ $\gamma_{72}$ | $D_{15}$ $\gamma_{11}$ | $D_{16}$ $\gamma_{72}$ | $D_{17}$ $\gamma_{13}$ | $D_{18}$ $\gamma_{72}$ | $D_{19}$ $\gamma_{11}$ | ← PRESENT LINE |
| $D_{21}$ $\gamma_{34}$ | $D_{22}$ $\gamma_{21}$ | $D_{23}$ $\gamma_{34}$ | $D_{24}$ $\gamma_{24}$ | $D_{25}$ $\gamma_{34}$ | $D_{26}$ $\gamma_{21}$ | $D_{27}$ $\gamma_{34}$ | $D_{28}$ $\gamma_{24}$ | $D_{29}$ $\gamma_{34}$ | |
| $D_{31}$ $\gamma_{14}$ | $D_{32}$ $\gamma_{31}$ | $D_{33}$ $\gamma_{12}$ | $D_{34}$ $\gamma_{32}$ | $D_{35}$ $\gamma_{14}$ | $D_{36}$ $\gamma_{31}$ | $D_{37}$ $\gamma_{12}$ | $D_{38}$ $\gamma_{32}$ | $D_{39}$ $\gamma_{14}$ | |
| $D_{41}$ $\gamma_{34}$ | $D_{42}$ $\gamma_{23}$ | $D_{43}$ $\gamma_{34}$ | $D_{44}$ $\gamma_{22}$ | $D_{45}$ $\gamma_{34}$ | $D_{46}$ $\gamma_{23}$ | $D_{47}$ $\gamma_{34}$ | $D_{48}$ $\gamma_{22}$ | $D_{49}$ $\gamma_{34}$ | |

SECOND PREVIOUS LINE
FIRST PREVIOUS LINE

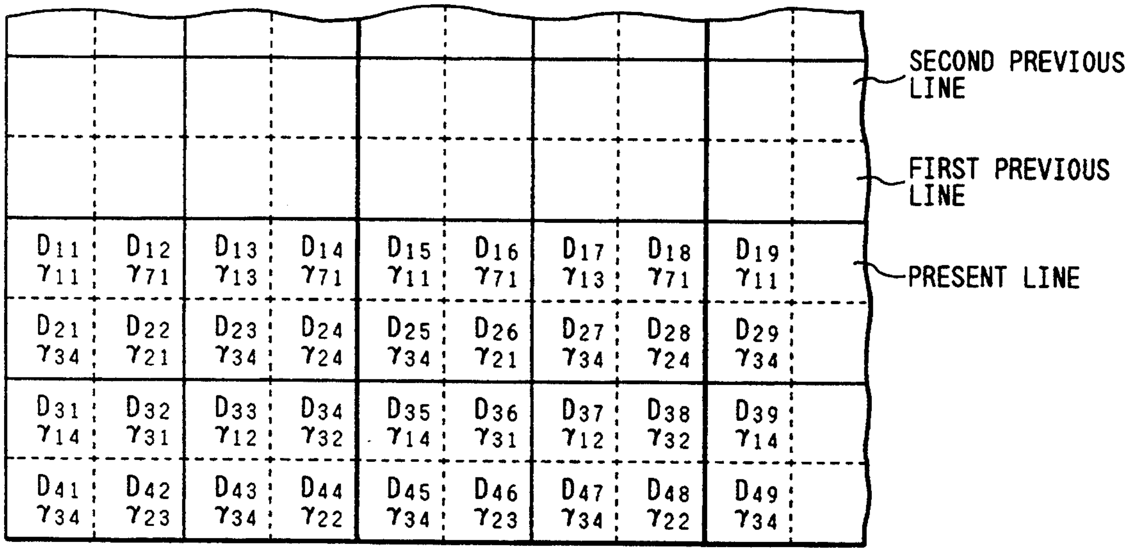

FIG. 62

| | | | | | | | | | |
|---|---|---|---|---|---|---|---|---|---|
| $D_{11}$ $\gamma_{11}$ | $D_{12}$ $\gamma_{71}$ | $D_{13}$ $\gamma_{13}$ | $D_{14}$ $\gamma_{71}$ | $D_{15}$ $\gamma_{11}$ | $D_{16}$ $\gamma_{71}$ | $D_{17}$ $\gamma_{13}$ | $D_{18}$ $\gamma_{71}$ | $D_{19}$ $\gamma_{11}$ | ←PRESENT LINE |
| $D_{21}$ $\gamma_{34}$ | $D_{22}$ $\gamma_{21}$ | $D_{23}$ $\gamma_{34}$ | $D_{24}$ $\gamma_{24}$ | $D_{25}$ $\gamma_{34}$ | $D_{26}$ $\gamma_{21}$ | $D_{27}$ $\gamma_{34}$ | $D_{28}$ $\gamma_{24}$ | $D_{29}$ $\gamma_{34}$ | |
| $D_{31}$ $\gamma_{14}$ | $D_{32}$ $\gamma_{31}$ | $D_{33}$ $\gamma_{12}$ | $D_{34}$ $\gamma_{32}$ | $D_{35}$ $\gamma_{14}$ | $D_{36}$ $\gamma_{31}$ | $D_{37}$ $\gamma_{12}$ | $D_{38}$ $\gamma_{32}$ | $D_{39}$ $\gamma_{14}$ | |
| $D_{41}$ $\gamma_{34}$ | $D_{42}$ $\gamma_{23}$ | $D_{43}$ $\gamma_{34}$ | $D_{44}$ $\gamma_{22}$ | $D_{45}$ $\gamma_{34}$ | $D_{46}$ $\gamma_{23}$ | $D_{47}$ $\gamma_{34}$ | $D_{48}$ $\gamma_{22}$ | $D_{49}$ $\gamma_{34}$ | |

SECOND PREVIOUS LINE
FIRST PREVIOUS LINE

THERMAL TRANSFER IMAGE FORMING APPARATUS USING DIFFERENT GAMMA FUNCTIONS FOR DIFFERENT DENSITY RANGES

BACKGROUND OF THE INVENTION

1. Field of the Invention

The present invention relates to an image forming apparatus in which a plurality of heating resistor elements are arranged in a line on a surface of a substrate, and the heating resistor elements are made to generate heat selectively in accordance with pixel data so as to melt ink of an ink sheet or an ink ribbon to thereby form dots on recording paper, and more particularly, to a technique for controlling the gradation and color reproduction in such an image forming apparatus.

2. Description of the Related Art

A thermal transfer printer has a recording head provided with small heating resistor elements integrated on a substrate and uses an ink sheet or ribbon formed of macromolecular film coated with wax containing pigment so that the printer forms dots on recording paper by melting ink in a small area of the ink sheet or ribbon through supply of signals based on pixel data to the heating resistor elements selectively.

Such a thermal transfer image forming apparatus has been used widely in the field of full-color printing requiring high- density dot forming, because heating resistor elements as dot forming elements can be arranged in a small size.

In the case where such a printer is used for full-color printing, generally, it is necessary to repeat a process of performing printing in which four colors in total, that is, black in addition to three primary colors of yellow, magenta and cyan are used, and a recording medium is returned to its initial position for every primary color. Accordingly, there arises a problem in that the quality of a printed image is deteriorated by displacement produced between pixel data to be printed and printed points on the recording medium.

In order to solve the aforementioned problem, therefore, a measure to set the print position for every primary color in a predetermined direction with respect to the recording medium, that is, to set a so-called screen angle so as to prevent color cloud caused by the positional difference at the time of the formation of dots as sufficiently as possible has been adapted.

For example, in a recording apparatus of an ink-jet system, a wire-dot recording system and the like, in which the size of each dot which can be printed is fixed, there has been proposed a method in which density is expressed by the number of dots formed in a unit area (for example, an area of 4×4 dots) and the position where at least one dot is formed in the unit area is defined for every primary color, so that the dot forming position is arranged in a specified direction with respect to the recording medium.

In those systems, however, there has been a problem in that the number of dots to be assigned to one pixel increases to make the resulting image rough as the number of expressible density levels increases, because density levels are expressed by the number of dots.

To solve the aforementioned problem, as disclosed in Japanese Patent Unexamined Publication No. Sho 61-189774, there has been proposed a printing system in which the size of a dot per se formed on a recording medium is made variable to make it possible to express the density level by the dot per se, and a plurality of matrices as dot forming angles are set to thereby set both a density gradation and a screen angle desirably while a threshold is set in advance correspondingly to a unit of image reading on an original, that is, a so-called pixel.

When such a proposed printing system is used, the improvement of the gradient and the setting of the screen angle can be provided simultaneously. The proposed printing system, however, requires a large quantity of matrix data if the gradient is made higher. There arises therefore a problem in that the capacity of a memory for storing the large quantity of matrix data therein increases.

SUMMARY OF THE INVENTION

A first object of the present invention is to provide a thermal transfer image forming apparatus, in which the thermal interference between heating resistor elements constituting a dot forming means is made small as sufficiently as possible so that gradation is expressed by the area of each dot per se to thereby improve the gradation property and the resolution, and, on the other hand, the form of application of gamma conversion characteristics is changed to thereby change, for every primary color, the positions where main dots corresponding to at least 2×2 pixels are formed, whereby both generation of net-like noise and color cloud due to displacement in dot forming position can be prevented to make the printing quality excellent.

A second object of the invention is to provide a novel thermal transfer image forming apparatus in which even in the case where the quantity of data for setting the screen angle is small, a screen angle can be set while both the gradient and resolution are kept.

A third object of the invention is to provide a novel thermal transfer image forming apparatus in which the density change of each dot with the temperature change of the recording head substrate can be prevented by a simple circuit configuration.

To perform the aforementioned objects, according to the present invention, the thermal transfer image forming apparatus according to the present invention comprises: a recording head having a plurality of heating resistor elements arranged in a line; means for carrying a sheet of recording paper and an ink sheet at a predetermined pitch; an image data reading means for continuously reading N-lines' pixel data (N being an integer of $N \geqq 2$) constituting input image data; a sampling means for sampling the N-lines' pixel data into a matrix of N×N pixels; a gamma conversion means having a first gamma characteristic conversion function for outputting print data to form main dots by performing gamma conversion proportionally in a density range of from a low density to a high density, a second gamma characteristic conversion function for outputting print data being lower in density than the first gamma characteristic conversion function to form subsidiary dots, and third and fourth gamma characteristic conversion functions to form no dot in a large part of the density range, thereby expressing the pixel density as a dot size for each of the N×N pixels; a conversion characteristic selection means for assigning the gamma characteristic conversion functions to the sampled N×N pixels to arrange dots based on the first gamma characteristic conversion function at a predetermined angle; and means for supplying electric energy corresponding to the print data to the heating resistor elements of the recording head.

Other objects of the invention will become clear from the following description of embodiments.

BRIEF DESCRIPTION OF THE DRAWINGS

FIG. 13 is an explanatory view showing an example of application of the gamma characteristic conversion functions depicted in FIG. 6;

FIG. 14 is an explanatory view showing the forth of continuous application of the gamma characteristic conversion functions depicted in FIG. 13;

FIGS. 15(I) to 15(V) are explanatory views showing print forms obtained by using the gamma characteristic conversion functions depicted in FIG. 13;

FIG. 16 is an explanatory view showing another example of application of the gamma characteristic conversion functions depicted in FIG. 6;

FIG. 17 is an explanatory view showing the form of continuous application of the gamma characteristic conversion functions depicted in FIG. 16;

FIGS. 18(I) to 18(V) are explanatory views showing print forms obtained by using the gamma characteristic conversion functions depicted in FIG. 16;

FIGS. 19(*a*) and 19(*b*) are explanatory views showing a further example of application of the gamma characteristic conversion functions depicted in FIG. 6;

FIG. 20 is an explanatory view showing the form of continuous application of the gamma characteristic conversion functions depicted in FIG. 19;

FIGS. 21(I) to 21(V) are explanatory views showing print forms obtained by using the gamma characteristic conversion functions depicted in FIG. 19;

FIGS. 22(*a*) and 22(*b*) are explanatory views showing a further example of application of the gamma characteristic conversion functions depicted in FIG. 6;

FIG. 23 is an explanatory view showing the form of continuous application of the gamma characteristic conversion functions depicted in FIG. 22;

FIGS. 24(I) to 24(V) are explanatory views showing print forms obtained by using the gamma characteristic conversion functions depicted in FIG. 22;

FIGS. 25(*a*) and 25(*b*) are explanatory views showing a further example of application of the gamma characteristic conversion functions depicted in FIG. 6;

FIG. 26 is an explanatory view showing the form of continuous application of the gamma characteristic conversion functions depicted in FIG. 25;

FIGS. 27(I) to 27(V) are explanatory views showing print forms obtained by using the gamma characteristic conversion functions depicted in FIG. 25;

FIGS. 37, 38 and 39(I) to 39(V) are views showing an example of application of the gamma characteristic conversion function groups and printing results obtained by using thereof;

FIGS. 40, 41 and 42(I) to 42(V) are views showing an example of application of the gamma characteristic conversion function groups, the form of continuous application thereof to image data and printing results obtained by the continuous application;

FIGS. 43(*a*), 43(*b*), 44 and 45(I) to 45(V) are views showing an example of application of the gamma characteristic conversion function groups, the form of continuous application thereof to image data and printing results obtained by the continuous application;

FIGS. 46(*a*), 46(*b*), 47 and 48(I) to 48(V) are views showing an example of application of the gamma characteristic conversion function groups, the form of continuous application thereof to image data and printing results obtained by the continuous application;

FIGS. 49(*a*), 49(*b*), 50 and 51(I) to 51(V) are views showing an example of application of the gamma characteristic conversion function groups, the form of continuous application thereof to image data and printing results obtained by the continuous application;

FIGS. 54, 55 and 56(I) to 56(V) are views showing the form of application of the gamma characteristic conversion function groups depicted in FIGS. 52 and 53, the form of continuous application thereof and printing results obtained by the continuous application thereof;

FIGS. 58, 59, 60, 61 and 62 are explanatory views showing the forms of application of the gamma characteristic conversion functions for correcting the thermal history of the recording head.

DETAILED DESCRIPTION OF THE PREFERRED EMBODIMENTS

Embodiments according to the present invention will be described hereunder in detail with reference to the drawings.

Figure 2:
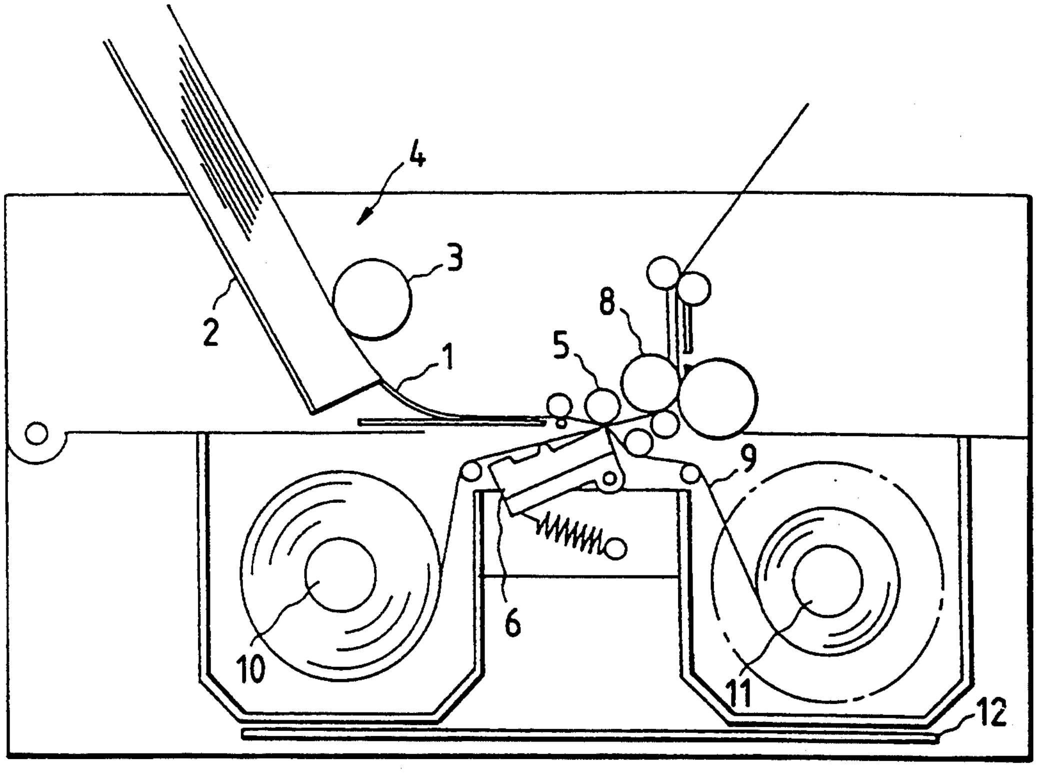
FIG. 2 is a sectional view showing a thermal transfer printer according to an embodiment of the invention.

Referring to FIG. 2, there is shown a thermal transfer printing mechanism and a controller according to an embodiment of this invention. The thermal transfer printing mechanism comprises a paper supply mechanism 4 for pulling a sheet of recording paper 1 out of a stacker 2, which stocks sheets of recording paper 1, through a pickup roller 3 to convey the recording paper 1 to a print region, a platen 5 for conveying the recording paper 1 and an ink sheet 9 at a predetermined speed, a thermal transfer recording head 6 which is brought into forced contact with the platen 5 at the time of printing, a conveyance roller 8 for returning the recording paper 1 to the stacker 2 after printing, a stock roller 10 for feeding the ink ribbon 9, and a takeup roller 11. Further, a circuit substrate 12 having a control circuit incorporated therein, which will be described later, is put in the lower portion of a box.

Figure 3:
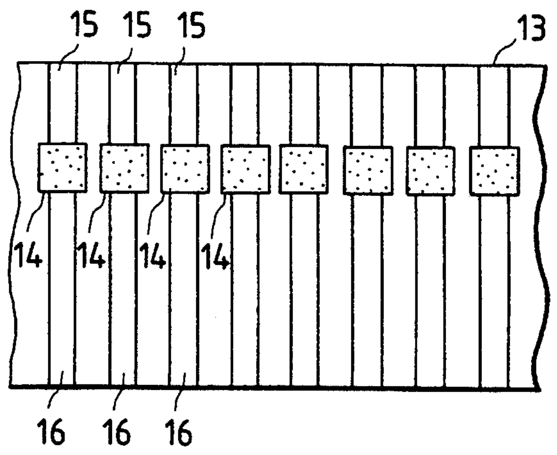
FIG. 3 is an enlarged front view of a recording head used in the present invention.

As shown in FIG. 3, the thermal transfer recording head 6 includes a substrate 13, an array of heating resistor elements 14, arranged in a line at intervals of a predetermined pitch on a surface of the substrate 13, and lead wires 15 and 16 led out in a direction of feeding of paper.

Figure 4:
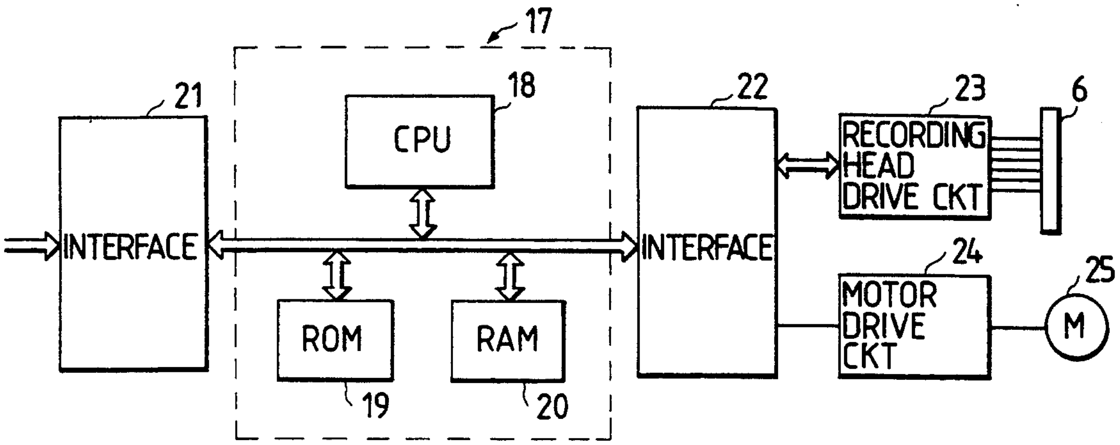
FIG. 4 is a block diagram showing an example of the controller of the thermal transfer printer depicted in FIG. 2.

Referring to FIG. 4, there is shown a control circuit according to an embodiment of this invention. In the drawing, the reference numeral 17 designates a microcomputer constituting a main portion of the controller. The microcomputer 17 comprises a CPU 18, an ROM 19 for storing control programs, data processing programs which will be described later and gamma characteristic conversion functions, and an RAM 20 serving as a data processing buffer and also as a frame memory. The microcomputer 17 is connected, through interfaces 21 and 22, to an external device such as a personal computer or the like, a recording head drive circuit 23, and a motor drive circuit 24.

Figure 5:
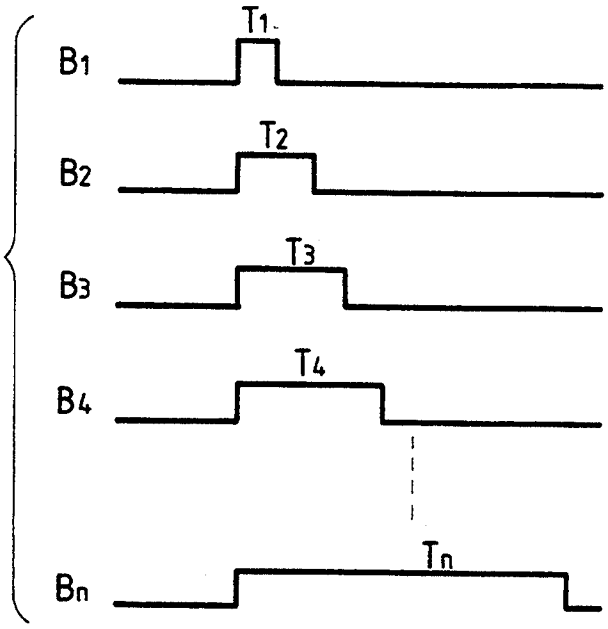
FIG. 5 is a waveform graph showing an example of the signal for driving the recording head in the present invention.

The recording head drive circuit 23 is arranged so that electric energy corresponding to density data outputted from the interface 22 is supplied to each of the heating resistor elements 14 of the thermal transfer recording head 6. For example, as shown in FIG. 5, the recording head drive circuit 23 is arranged so that pulse-like electric power successively increasing in time T1, T2, T3, T4, . . . Tn correspondingly to the density B1, B2, B3, B4, . . . Bn is supplied to each of the heating resistor elements 14 of the thermal transfer recording head 6.

The motor drive circuit 24 is provided to drive a motor 25 connected to the pickup roller 3, the platen 5 and the conveyance roller 8, and the motor drive circuit 24 is arranged to output a drive pulse to give the motor 25 a rotation direction and a rotation speed in accordance with an instruction outputted from the interface 22.

Figure 1:
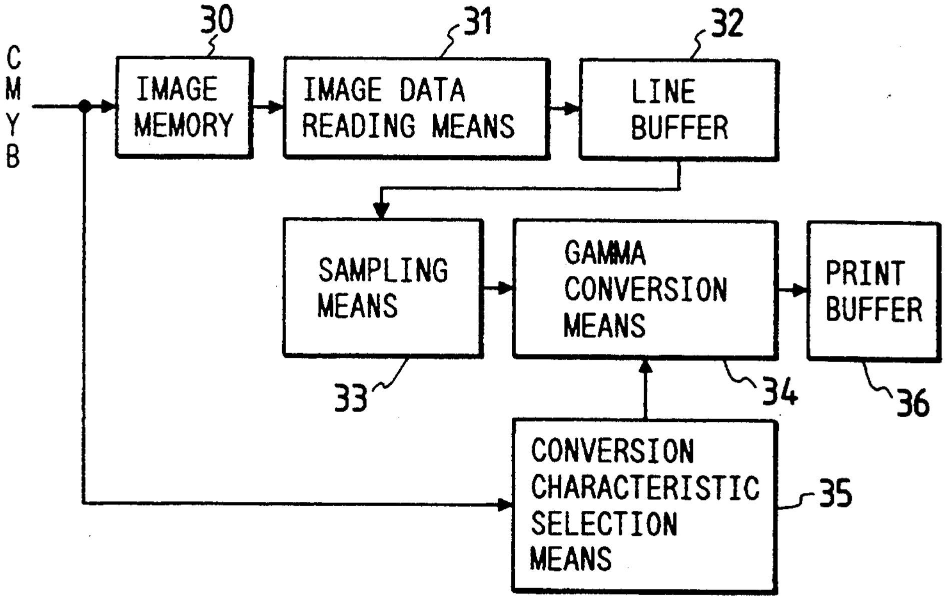
FIG. 1 is a block diagram showing the function of a microcomputer according to one embodiment of the present invention.

Referring to FIG. 1, there is shown the functional operation of the microcomputer 17 necessary for color printing with the best use of the aforementioned basic printing function. In the drawing, the reference numeral 30 designates an image memory for storing image data outputted from the external device. The image memory 30 stores a predetermined quantity of image data (for example, one-page's image data for each color) outputted from the external device. The reference numeral 31 designates an image data reading means for extracting N-lines' pixel data (N being an integer of $N \geqq 2$) from the image data stored in the image memory 30 while shifting the image data by N lines (in this embodiment, by 2 lines), to supply the N-lines' image data to a line buffer 32. The reference numeral 33 designates a sampling means for sampling N columns (N is an integer of $N \geqq 2$) in a main scanning direction from the image data stored in the line buffer 32, that is, for sampling $N \times N$ pixels (in this embodiment, $2 \times 2$ pixels), to supply the sampled data to a gamma conversion means 34.

Figure 6:
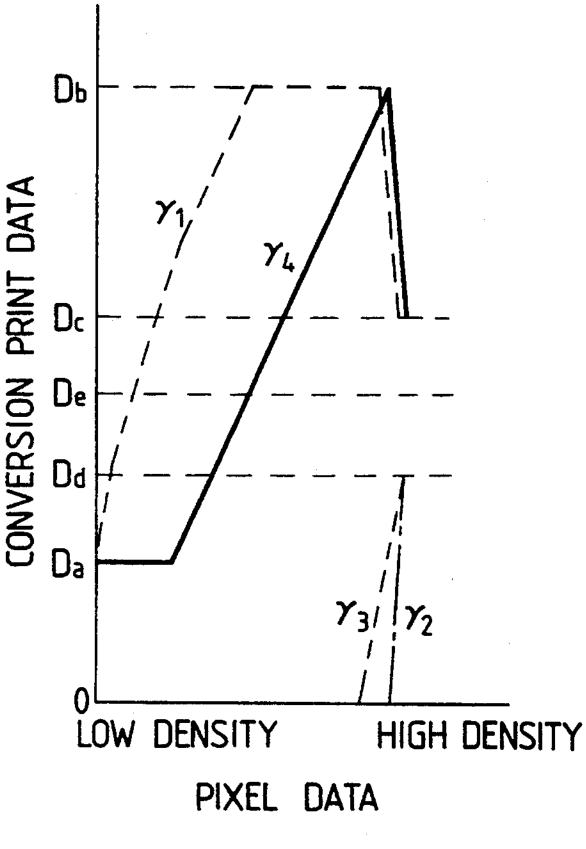
FIG. 6 is a graph showing gamma characteristic conversion functions used in the present invention.

The gamma conversion means 34 is arranged to store data for defining the relationship between the density of pixel data and the conversion print data to designate the density of dot at the time of printing (hereinafter referred to as "conversion print data") correspondingly to the density of pixel data as shown in FIG. 6 to thereby function as a filter or a print density setting means for the pixel data given from the sampling means.

Referring to FIG. 6, there is shown the gamma characteristic conversion functions set in the gamma conversion means 34. A plurality of characteristics (in this embodiment, four kinds of gamma characteristic conversion functions) are stored in the gamma conversion means 34.

A gamma characteristic conversion function $\gamma 1$ has a characteristic in which: conversion print data Da for supplying minimum energy to keep the temperature of a heating resistor element constant regardless of the environment is set, in the case where the density of pixel data is zero, to form no transfer dot; the density of conversion print data is increased from Da to a maximum density Db proportionally to the density of pixel data in an intermediate density region thereof; the conversion print data Db is kept constant in a range of from the intermediate density region to a high density region; and the density of conversion print data is decreased to a density Dc near the density of image data in the maximum density of pixel data.

The density De is set to a dot density value of 11.8 dot/mm in the case of binary printing such as character printing. That is, the density De is generally set to a value for supplying energy of about 0.125 mJ/dot to a heating resistor element.

The density Db is set to a value for supplying energy about twice as much as the energy of the density De. The density Dc is set to a value slightly higher than the value of De. The density Dd is set to a value slightly lower than the value of De.

A gamma characteristic conversion function $\gamma 2$ has a characteristic in which the density Dd near the density of pixel data is generated only in the vicinity of the maximum density value of pixel data.

A gamma characteristic conversion function $\gamma 3$ has a characteristic in which the density Dd is generated only in the vicinity of the maximum density value of pixel data in the same manner as the gamma characteristic conversion function γ2.

A gamma characteristic conversion function γ4 has a characteristic in which: the conversion print data $D_a$ for forming a minimum size dot stably is kept constant in the low density region of pixel data; the density of conversion print data is increased substantially linearly from Da to a maximum conversion print data Db proportionally to the density of pixel data in a range of from the intermediate density region to the high density region; and the density of conversion print data is decreased to the density Dc near the density of image data in the maximum density region of pixel data.

Because the gamma conversion means 34 has the aforementioned characteristics, gamma characteristics can be assigned to four pixels in the sampled matrix data so that the sampling area can be expressed not only through generation of a main dot as a center of image expression and a subsidiary dot adjacent to the main dot on the basis of the conversion characteristics γ1 and γ4 but through addition of dots respectively based on the conversion characteristics γ2 and γ3 thereto for the maximum density of pixel data.

The reference numeral 35 designates a conversion characteristic selection means in which data for assigning the four gamma characteristic conversion functions γ1 to γ4 to sampled matrix image data D11, D12, . . . D14, D21, D22, . . . D24, D31, D32, . . . D34, D41, D42 . . . D44 for every primary color given to the image memory 30. The reference numeral 36 designates a print buffer connected to the gamma conversion means.

To help the understanding of the present invention, the relationship between the drive form of a heating resistor element and the resulting dot will be described hereunder.

Figure 7:
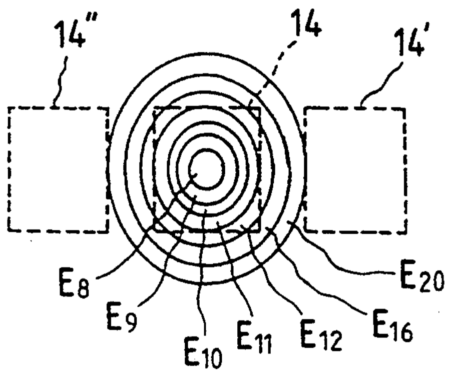
FIG. 7 is an explanatory view showing the relation between energy supplied to the recording head and heating areas.
Figure 8:
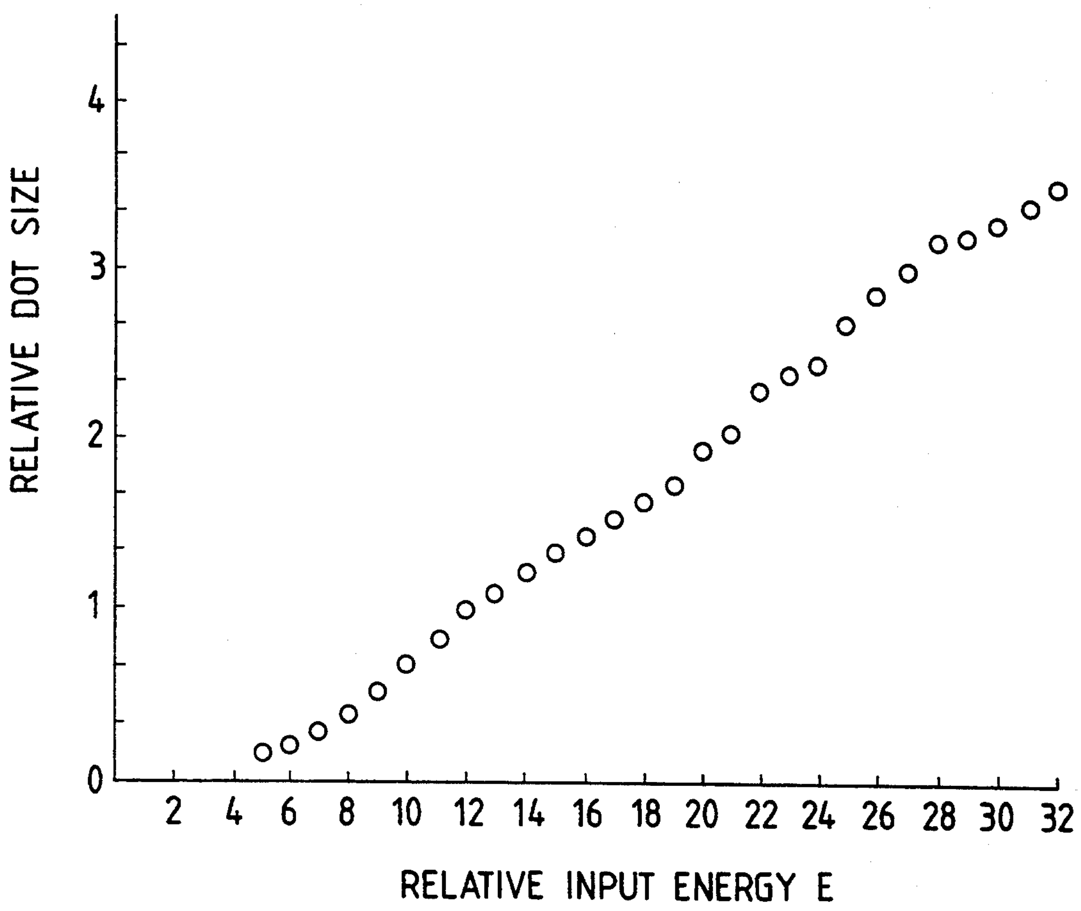
FIG. 8 is a graph showing the relation between the energy supplied to a heating resistor element and the dot size in the driving method depicted in FIG. 7.
Figure 9I:
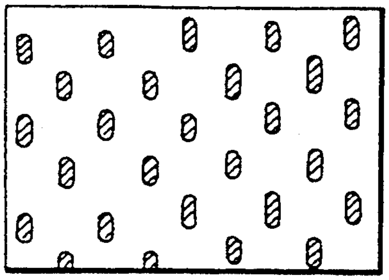
FIGS. 9(I) to 9(III) are explanatory views showing the relation between the driving method depicted in FIG. 7 and print patterns.
Figure 9:
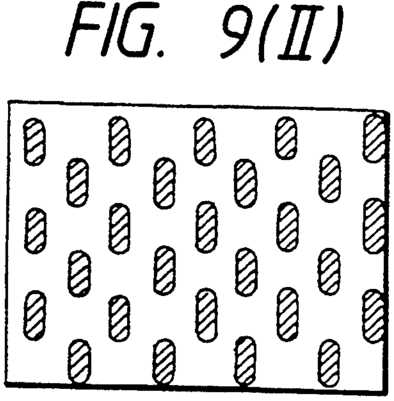

When printing is performed through energization of one heating resistor element 14 while the adjacent heating resistor elements 14' and 14" are in stoppage as shown in FIG. 7, the heating resistor element 14 thus driven is free from thermal interference with the adjacent heating resistor elements 14' and 14" so that the areas of the adjacent heating resistor elements 14' and 14" can be used as a dot forming area. As a result, the size of the resulting dot is proportional to relative input energy E supplied to the heating resistor element even in the case where the relative input energy E is separated into 32 stages as shown in FIG. 8. As a result, very high gradations can be expressed. Accordingly, dots having a density faithfully proportional to the density of pixel data can be formed. As a result, not only separate dots are formed in the intermediate density and in the high density but a solid image (FIG. 9(III)) is formed in the maximum density, when the energy increases as shown in FIGS. 9(I) to 9(III).

Figure 10:
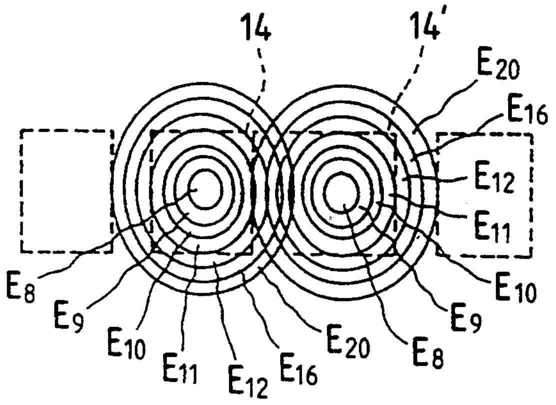
FIG. 10 is an explanatory view showing the relation between the supplied energy and the heating areas in the recording head driving method used in the present invention.

Even in the case where printing is performed through driving on two heating resistor elements 14 and 14' while the heating resistor elements adjacent to these two heating resistor elements 14 and 14' are in stoppage as shown in FIG. 10, thermal interference between heating resistor elements can be prevented practically sufficiently. Accordingly, dots can be formed in the same gradation characteristic as in the case where only one heating resistor element is driven as described above.

Figure 11:
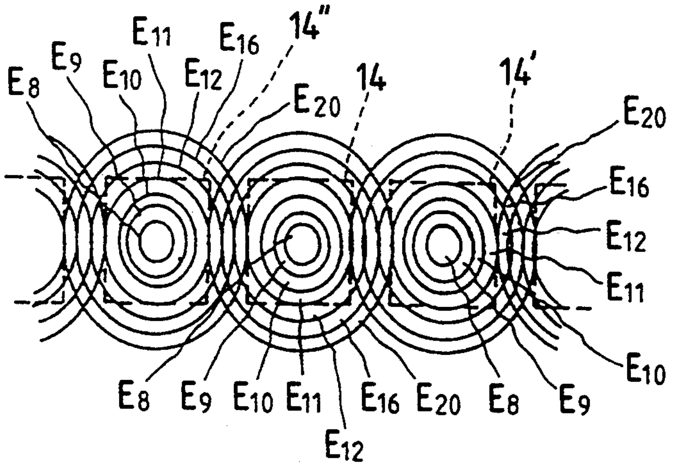
FIG. 11 is an explanatory view showing an example of the conventional recording head driving method.
Figure 12I:
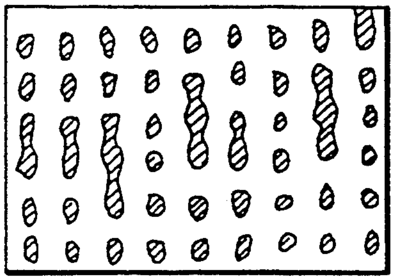
FIGS. 12(I) to 12(III) are explanatory views showing the relation between the conventional driving method depicted in FIG. 11 and print patterns.
Figure 12:
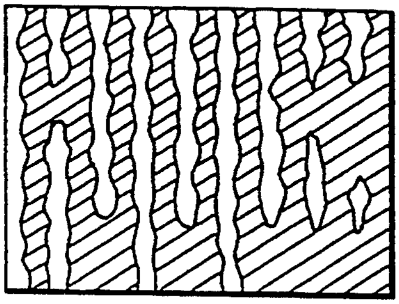

On the contrary, when also the adjacent heating resistor elements are driven, thermal interference between the heating resistor elements becomes large as shown in FIG. 11. As a result, there arise disadvantages that dots to be formed separately are connected at places in the intermediate density region (FIG. 12(I)) to produce scattering in gradation and that dots are connected perfectly in the vicinity of the high density region (FIG. 12(II)), as shown in FIGS. 12(I) to 12(III).

The case where the aforementioned gamma conversion characteristics are applied thereto will be described hereunder.

The form of application as shown in FIG. 13, that is, the case where conversion characteristics γ1, γ2, γ3 and γ4 are applied respectively to pixel data D11, D12, D21 and D22 in a matrix of 2×2 pixels sampled by the sampling means 33, will be described as an example.

The pixel data D11 sampled by the sampling means 33 is converted into a conversion print data linearly proportional to the density thereof by the gamma characteristic conversion function γ1 of the gamma conversion means 34 selected by the conversion characteristic selection means 35. The pixel data D12 is converted into a conversion print data by the gamma characteristic conversion function γ2 so that dot forming energy is not applied except the case where the density Dd is given when the density takes its maximum value. The pixel data D21 is converted into a conversion print data so that dot forming energy is not applied except the case where the density Dd is given when the density of pixel data takes its maximum value. The pixel data D22 is converted into a conversion print data so that energy substantially sufficiently small to avoid dot forming is applied in the low density region and so that the convention print data is linearly proportional to the density of pixel data in the density region of not lower than the intermediate density region.

As a result, when the first-line pixel data D11 and D12 are printed, a dot corresponding to the pixel data D11 is formed but a dot corresponding to the adjacent pixel data D12 is not formed for pixel data of intermediate density appearing frequently in an ordinary image.

When the printing of the first-line pixel data is completed as described above, the pixel data D21 and D22 in the same sampling area are printed. Because the functions γ3 and γ4 are respectively assigned to the pixel data D21 and D22, the pixel data D22 is printed but the pixel data D21 is not printed in the intermediate density region. Because adjacent heating resistor elements are in stoppage also in the printing of the second-line pixel data, the pixel data as a subject of printing is formed as a dot having a density faithful to the density subjected to conversion by the function γ4. Thereafter, printing is continued in the form as shown in FIG. 14, that is, by repeating the form of assignment of gamma characteristic conversion functions as shown in FIG. 13.

As a result, four pixels specified from the sampling area are expressed so that the pixel data D11 and D22 are printed respectively as a main dot and as a subsidiary dot. Accordingly, the four pixel data D11 to D22 are expressed so that the main dot is supplemented with the subsidiary dot.

That is, in the case where the density of the area constituted by the thus sampled four pixels is low, dots corresponding to the pixel data D11 assigned for the gamma characteristic conversion function γ1 are printed (FIG. 15(I)). As the density of the sampled area increases, dots 40 corresponding to the pixel data D22 assigned for the gamma characteristic conversion function γ4 are also printed (FIG. 15(II)). As the density of pixel data increases further, the size of dots corresponding to the pixel data D11 and D22 increases so that an image is printed to narrow the island-like blank portions 41 (FIG. 15(III), 15(IV) and 15(V)). As the result of forming the island-like blank portions 41, ink of the area proportional to the density of image data is transferred to recording paper securely without wasteful peeling of ink from the ink sheet even in the case of printing of high-density data.

FIG. 16 shows another form of conversion characteristics set by the conversion characteristic selection means 34. In FIG. 16, gamma characteristic conversion functions γ1, γ3, γ4 and γ2 are respectively assigned to four pixel data D11, D12, D21 and D22 sampled by the sampling means 33. As a result, a dot corresponding to the pixel data D11 is formed preferentially and a pixel after conversion of the pixel data D21 is formed as a subsidiary dot. When the aforementioned form is applied while the sampling area is shifted by one dot per two lines in the main scanning direction as shown in FIG. 17, only a dot corresponding to the pixel data D11 in the 2×2 matrix is formed in the case where the density of pixel data in the sampling area is low as shown in FIGS. 18(I) to 18(V). Further, the sampling area is shifted by one pixel as described above when the sampling area is moved by 2 lines in this density. Accordingly, subsidiary dots 42 are formed between the dots formed as the first-line pixel data. When printing is continued while the aforementioned procedure is repeated, an angle connecting dots placed at the shortest distance, that is, a screen angle, takes a value of 63.4 degrees.

FIGS. 19(*a*) and 19(*b*) show other forms of conversion characteristics set by the conversion characteristic selection means 35. In FIGS. 19(*a*) and 19(*b*), gamma characteristic conversion functions γ4, γ1, γ3 and γ2 are respectively assigned to four pixel data D11, D12, D21 and D22 as a first form (FIG. 19(*a*)), and gamma characteristic conversion functions γ3, γ2, γ4 and γ1 are respectively assigned to four pixel data D11, D12, D21 and D22 as a second form (FIG. 19(*b*)). These first and second forms are used alternately as shown in FIG. 20. That is, when the first form is selected for the four pixel data D11 to D22 in the first sampling area, a dot based on the pixel data D12 is printed preferentially. When the next pixel data adjacent to the sampling area are selected, the pixel data D22 is printed preferentially. As a result, dots at screen angles of ±26.6 degrees are formed in the low density region as shown in FIG. 21(I). When the image density of the sampling area increases, dots based on the gamma characteristic conversion function γ4 as well as the dots based on the gamma characteristic conversion function γ1 are printed. As a result, the pixel data D12 and D11 are respectively printed as main dots and as subsidiary dots in each odd line, and the pixel data D22 and D21 are respectively printed as main dots and as subsidiary dots in each even line.

FIGS. 22(*a*) and 22(*b*) show other forms of conversion characteristics set by the conversion characteristic selection means 35. In FIGS. 22(*a*) and 22(*b*), gamma characteristic conversion functions γ1, γ2, γ3 and γ4 are respectively assigned to four pixel data D11, D12, D21 and D22 as a first form (FIG. 22(*a*)), and gamma characteristic conversion functions γ4, γ3, γ2 and γ1 are respectively assigned to four pixel data D11, D12, D21 and D22 as a second form (FIG. 22(*b*)). These first and second forms are used alternately and in reverse order after two lines as shown in FIG. 23.

That is, when the first form is selected for the four pixel data D11 to D22 in the first sampling area, a dot based on the pixel data D11 is printed preferentially. When the next pixel data adjacent to the sampling area are selected, the pixel data D22 is printed preferentially. As a result, dots at a screen angle of 45 degrees are formed in the low density region as shown in FIG. 24(I). When the image density of the sampling area increases, dots based on the gamma characteristic conversion function γ4 as well as the dots based on the gamma characteristic conversion function γ1 are printed. As a result, in each odd line, the pixel data D11 are formed as main dots and the next pixel data D11 (pixel data D13 in the continuous form as shown in FIG. 23) adjacent thereto are formed as subsidiary dots at intervals of one dot from the main dots. In each even line, the pixel data D22 are formed as main dots and the pixel data D22 are formed as subsidiary dots at intervals of one dot from the main dots so as to be prior to the main dots.

FIGS. 25(*a*) and 25(*b*) show other forms of conversion characteristics set by the conversion characteristic selection means 35. In FIGS. 25(*a*) and 25(*b*), gamma characteristic conversion functions γ2, γ4, γ1 and γ3 are respectively assigned to four pixel data D11, D12, D21 and D22 as a first form (FIG. 25(*a*)), and gamma characteristic conversion functions γ3,γ1, γ4 and γ2 are respectively assigned to four pixel data D11, D12, D21 and D22 as a second form (FIG. 25(*b*)). These first and second forms are used alternately and in reverse order after two lines as shown in FIG. 26.

That is, when the first form is selected for the four pixel data D11 to D22 in the first sampling area, a dot based on the pixel data D21 is printed preferentially. When the next area is selected, the pixel data D12 is printed preferentially. As a result, dots at a screen angle of 135 degrees are formed in the low density region as shown in FIG. 27(I). When the image density of the sampling area increases, dots based on the gamma characteristic conversion function γ4 as well as the dots based on the gamma characteristic conversion function γ1 are printed. As a result, in each odd line, the pixel data D12 are formed as main dots and the pixel data D12 (the pixel data D12 in the continuous form as shown in FIG. 26) in the prior adjacent area are formed as subsidiary dots at intervals of one dot from the main dots. In each even line, the pixel data D21 are formed as main dots and the pixel data D21 are printed as subsidiary dots at intervals of one dot from the main dots so as to be posterior to the main dots.

In the forms of application of gamma conversion characteristics as shown in FIGS. 13, 16, 19(*a*) and 19(*b*) among the aforementioned embodiments, blank portions are formed substantially circularly and separately so that ink for non-dot forming portions can be prevented from peeling wastefully. As a result, a gradation faithful to the density of pixel data can be expressed.

Figure 28:
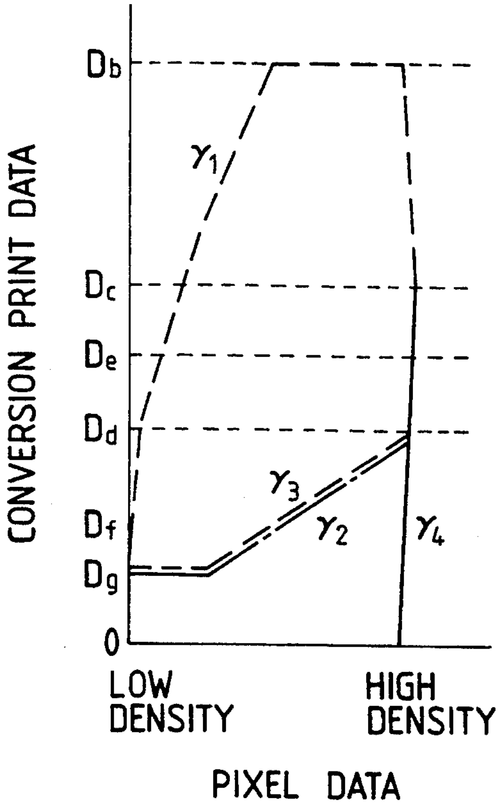
FIG. 28 is a graph showing another example of the gamma characteristic conversion functions used in the present invention.

FIG. 28 shows a second embodiment of the gamma characteristic conversion functions. The gamma characteristic conversion function γ1 has a characteristic in which: the conversion print data increases to the maximum density Db from a density to an extent that energy which is sufficient to keep the thermal condition of a heating resistor element constant in the same manner as the above-mentioned density Da but does not form any dot and which is slightly lower than that for the density Da in a range of from the low density region to the intermediate density region of the pixel data; the maximum density Db is then kept constant regardless of the density of pixel data; and then the conversion print data finally decreases to a density Dc in the vicinity of the maximum density of the pixel data. Each of the gamma characteristic conversion functions γ2 and γ3 is set so that a density Dg sufficiently small to form no dot is kept contact in the low density region of and the conversion print data then increases to a density Dd proportionally to the image density in a range of from the intermediate density region to the maximum density of pixel data. Further, the gamma characteristic conversion function γ4 is set so that the density Dd is given only in the maximum density of pixel data.

Figure 29I:
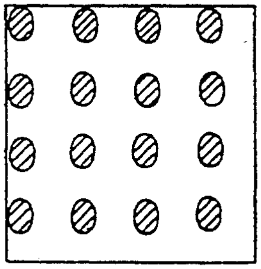
FIGS. 29(I) to 29(V) are explanatory views showing print forms obtained by using the gamma characteristic conversion functions depicted in FIG. 28.
Figure 29:
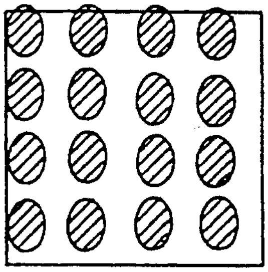
Figure 29:
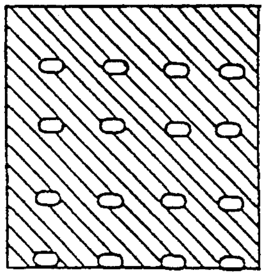
Figure 29V:
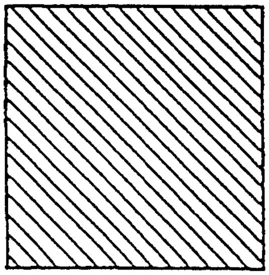

When printing is continued through application of the gamma characteristic conversion functions γ1 to γ4 to the pixel data D11, D12, D21 and D22 as shown in FIG. 14, dots based on the pixel data D11 are formed in the case where the density of pixel data in the sampling area is low. As a result, dots are formed like checkers as shown in FIG. 29(I), so that screen angles of 0 and 90 degrees are set. When the density of pixel data increases, dots based on the gamma characteristic conversion functions γ2 and γ3 are formed as shown in FIG. 29(III). Because not only the dots based on the gamma characteristic conversion functions γ2 and γ3 are small but the pixel data D21 are not used for forming dots except the maximum density of pixel data, dots are formed while one-dot circular blank portions 45 are formed. As a result, ink in the blank portions is prevented from peeling wastefully widely, so that dots of a gradation faithful to the density of pixel data can be formed.

Although description has been made upon the case where the second embodiment of the gamma characteristic conversion functions is used in the form as shown in FIG. 14, it is a matter of course that the second embodiment can be used in the forms as shown in FIGS. 17, 20, 23 and 26.

As described above, positions where main dots are formed are changed by the change of the form of application of the gamma characteristic conversion functions. Accordingly, sharp color printing can be performed by use of the advantage of screen angle setting in gravure printing or the like through setting of different application forms to three primary colors to express a color corresponding to pixel data.

Figure 30:
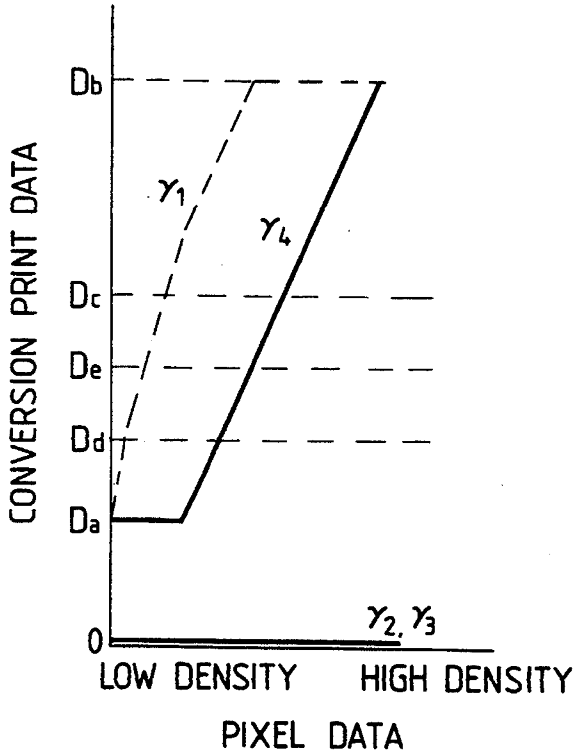
FIG. 30 is a graph showing a further example of the gamma characteristic conversion functions used in the present invention.
Figure 31:
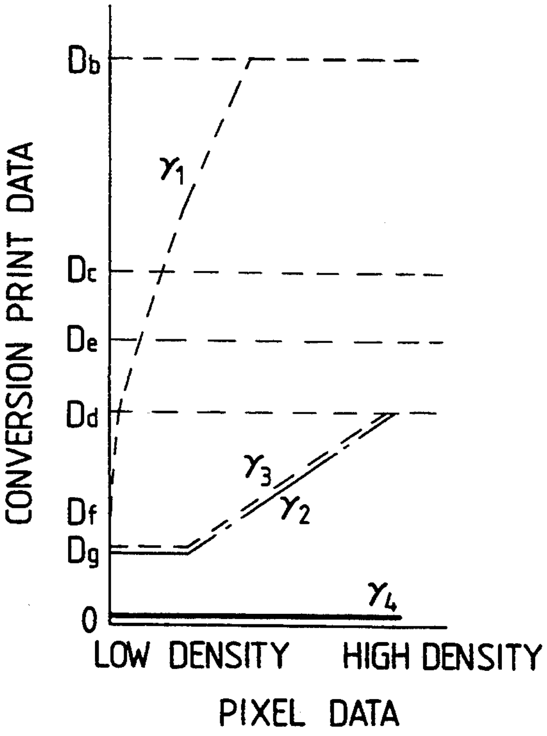
FIG. 31 is a graph showing a further example of the gamma characteristic conversion functions used in the present invention.

Although the gamma characteristic conversion functions in FIG. 6 are set so that the function γ1 decreases to the density Dc in the maximum density of pixel data and each of the functions γ2 and γ3 takes the density Dd in the maximum density of pixel data, an image of practically sufficient quality can be obtained by setting the function γ1 to keep the density Db even in the maximum density region of pixel data and setting each of the functions γ2 and γ3 to keep the zero density in all density regions of pixel data as shown in FIG. 30.

Although the gamma characteristic conversion functions in FIG. 28 are set so that the function γ1 decreases to the density Dc in the maximum density of pixel data and the function γ4 takes the density Dd in the maximum density of pixel data, an image of practically sufficient quality can be obtained by setting the function γ1 to keep the maximum density and setting the function γ4 to keep the zero density. As described above, the thermal transfer image forming apparatus according to the present invention comprises: a recording head having a plurality of heating resistor elements arranged in a line; means for carrying a sheet of recording paper and an ink sheet at a predetermined pitch; an image data reading means for continuously reading N-lines' pixel data (N being an integer of N≧2) constituting input image data; a sampling means for sampling the N-lines' pixel data into a matrix of N×N pixels; a gamma conversion means having a first gamma characteristic conversion function for outputting print data to form main dots by performing gamma conversion proportionally in a density range of from a low density to a high density, a second gamma characteristic conversion function for outputting print data being lower in density than the first gamma characteristic conversion function to form subsidiary dots, and third and fourth gamma characteristic conversion functions to form no dot in a large part of the density range, thereby expressing the pixel density as a dot size for each of the N×N pixels; a conversion characteristic selection means for assigning the gamma characteristic conversion functions to the sampled N×N pixels to arrange dots based on the first gamma characteristic conversion function at a predetermined angle; and means for supplying electric energy corresponding to the print data to the heating resistor elements of the recording head.

Accordingly, if a combination of common gamma characteristic conversion functions is set in the conversion characteristic selection means, dot forming positions can be specified, so that a screen angle can be set with the quantity of data reduced as less as possible, and at the same time, not only dots formed for each primary color can be arranged at a predetermined angle while both delicate gradation and high resolution are attained by changing the size of dots but rich color expression can be provided by improving ink separation through classification of the area of the non-transfer ink region into fine parts.

Figure 32:
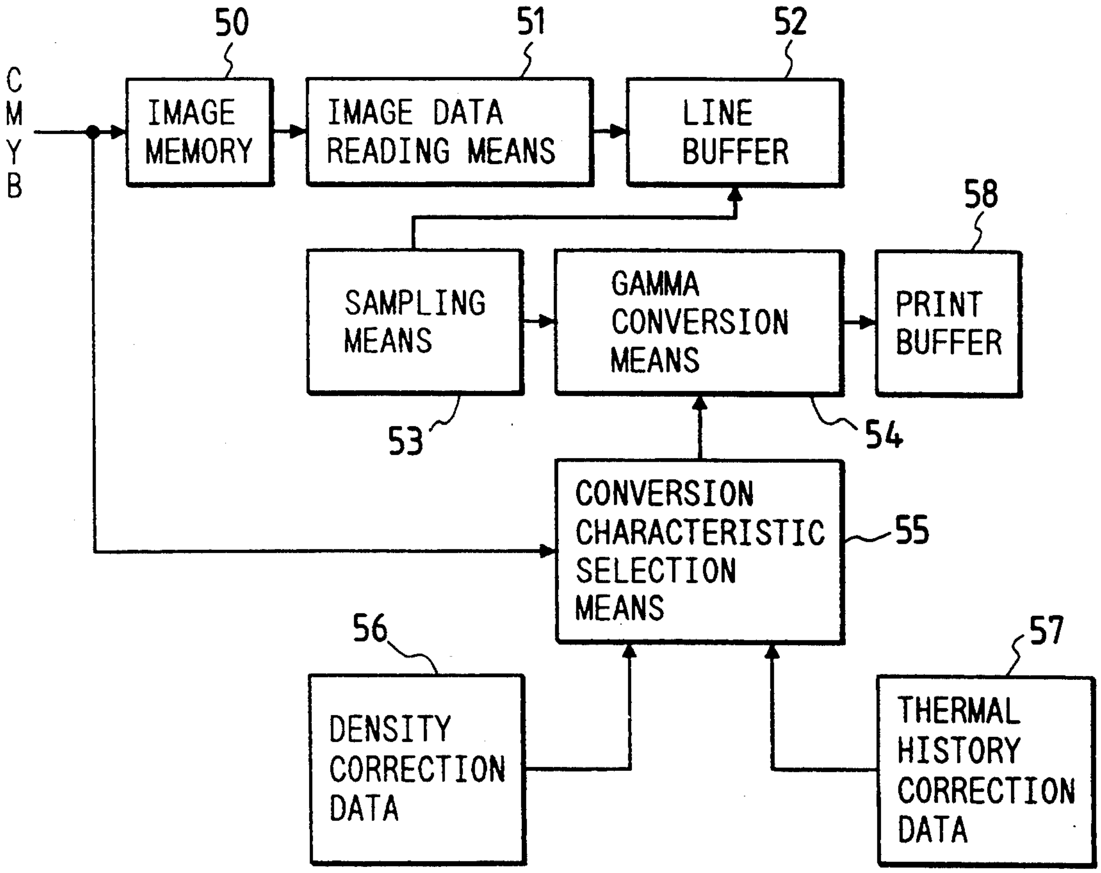
FIG. 32 is a block diagram showing the function of a microcomputer in a second embodiment of the present invention.

Referring to FIG. 32, there is shown the functional operation of the microcomputer 17 (FIG. 4) in the second embodiment of the present invention. In the drawing, the reference numeral 50 designates an image memory for storing image data outputted from the external device. The image memory 50 stores a predetermined quantity of image data, for example, one-page's image data for every color, outputted from the external device. The reference numeral 51 designates an image data reading means for extracting N-lines' pixel data (N being an integer of N≧2) from the image data stored in the image memory 50 while the image data is being shifted by N lines, 2 lines in this embodiment, and for supplying the extracted N-lines' pixel data to a line buffer 42. The reference numeral 53 designates a sampling means for sampling N columns (N being an integer of N≧2) in a main scanning direction from the pixel data stored in the line buffer 52, that is, for sampling N×N pixels, to supply the sampled data to a gamma conversion means 54.

The reference numeral 54 designates the aforementioned gamma conversion means in which data for defining the relation between the density of pixel data and print conversion data (which will be described later) as shown in FIGS. 33 through 36 are stored to function as means for changing the density of print data for the pixel data from the sampling means 53 and for performing a thinning-out operation.

The reference numeral 55 designates a conversion characteristic selection means which stores first, second, third and fourth gamma characteristic conversion function groups γ11 to γ14, γ21 to γ24, γ31 to γ34 and γ41 to γ44 corresponding to primary colors given to the image memory 50. The conversion characteristic selection means 55 selects one function from each of the function groups on the basis of data respectively stored in a density correction data storage means 56 and a thermal history correction data storage means 57, and assigns the thus selected functions to the sampled matrix-like image data D11, D12, . . . D14, D21, D22, . . . D24, D31, D32, . . . D34, and D41, D42, . . . D44. Reference numeral 58 designates a print buffer connected to the gamma conversion means.

FIGS. 33 through 36 show an example of the gamma characteristic conversion function groups set in the gamma conversion means 54. The gamma characteristic conversion means has a plurality of characteristics. In this embodiment, it has 16 functions classified into four groups.

Figure 33:
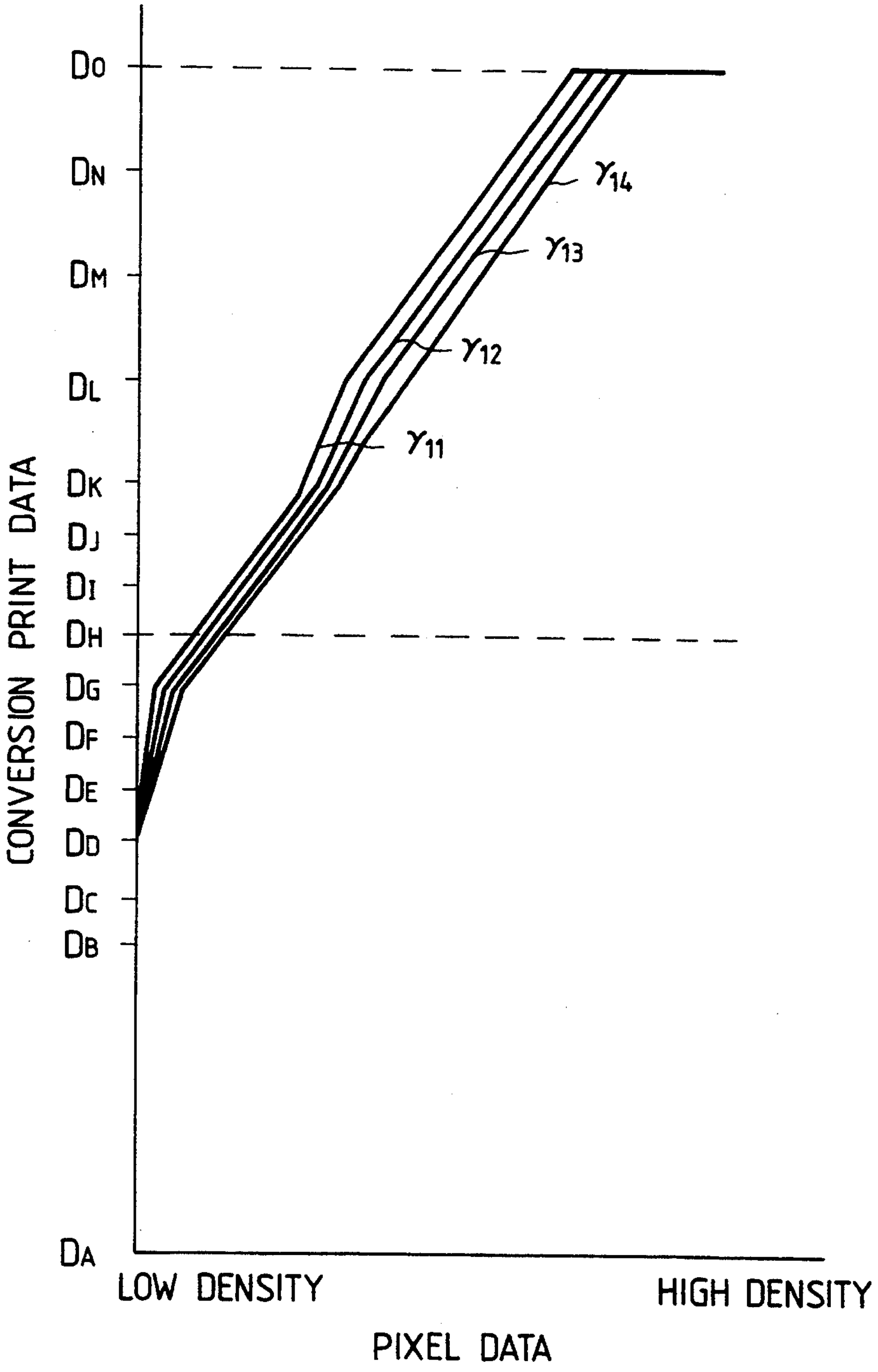
FIGS. 33, 34, 35 and 36 are graphs showing examples of the gamma characteristic conversion function groups used in the present invention.

Each of the functions γ11 to γ14 in the first gamma characteristic conversion function group shown in FIG. 33 has a characteristic in which: a conversion print data $D_D$ for supplying minimum energy to form no transfer dot but keep the temperature of a heating resistor element regardless of the environment is set in the case where the density of pixel data is zero; the conversion print data increases from $D_D$ to the maximum density $D_O$ proportionally in the intermediate density region of pixel data; and the conversion print data $D_O$ is kept in a range of from the intermediate density region to the high density region of pixel data. As is obvious from the drawing, the functions γ11, γ12, γ13 and γ14 constituting the first group are set so that values of conversion print data for pixel data are similar to one an other but slightly different by a predetermined quantity from one another. The value $D_H$ of the conversion print data is selected as a value for obtaining dot density of about 11.8 dot/mm in the case of binary printing such as character printing. That is, typically, the value $D_H$ is selected as a value for supplying energy of about 0.125 mJ/dot to a heating resistor element. The value $D_O$ is selected as a value for supplying energy twice as much as the energy of the density $D_H$.

Figure 34:
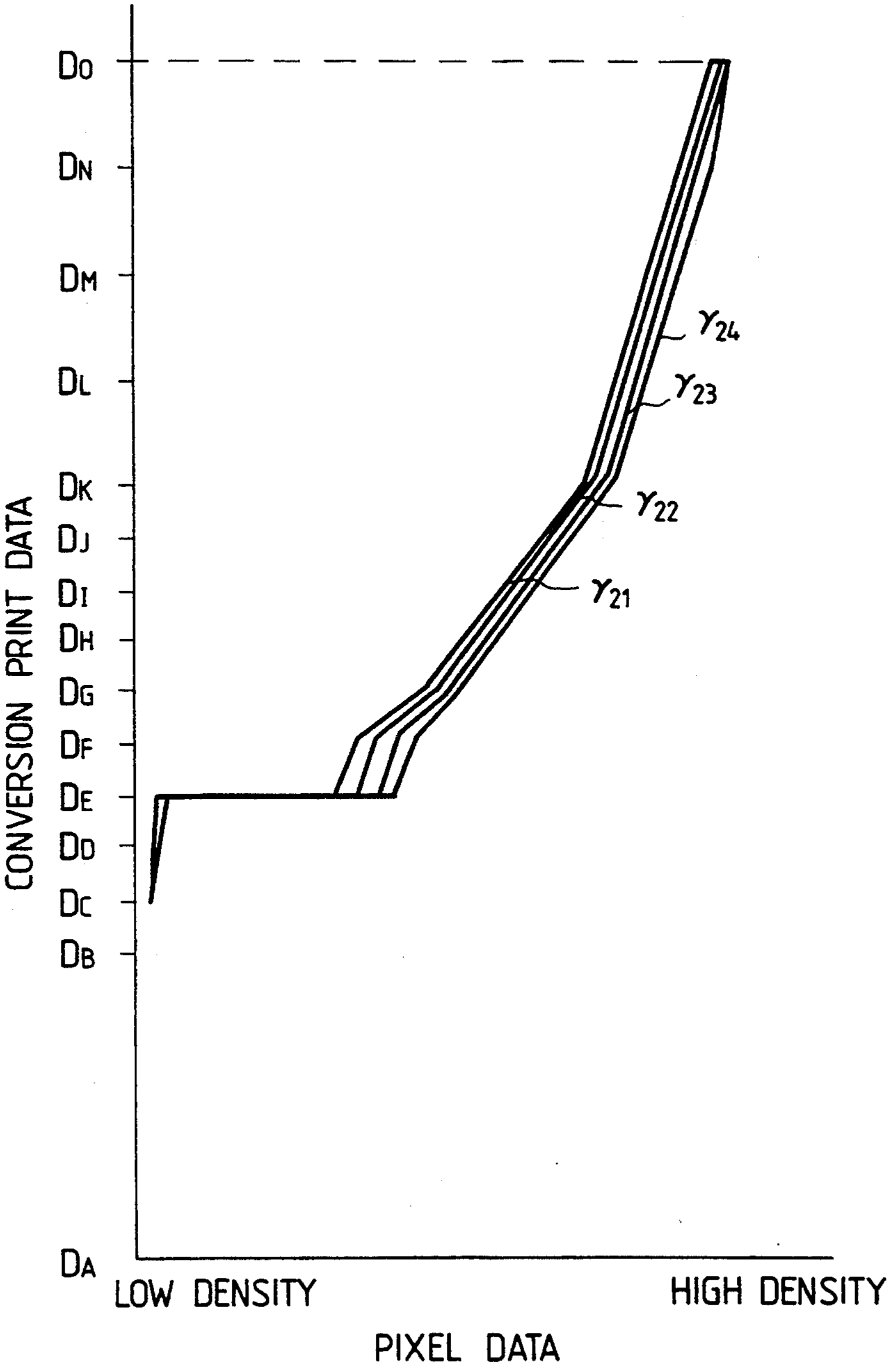

Each of the functions γ21 to γ24 in the second gamma characteristic conversion function group shown in FIG. 34 has a characteristic fundamentally in which: a conversion print data $D_E$ is kept to form a minimum-size dot stably in the low density region of pixel data; and the conversion print data increases to the maximum $D_O$ in a range of from the intermediate density region to the high density region of pixel data. The functions γ21 to γ24 are set to have similar characteristics like the first group and output conversion print data slightly different by a predetermined quantity for pixel data.

Figure 35:
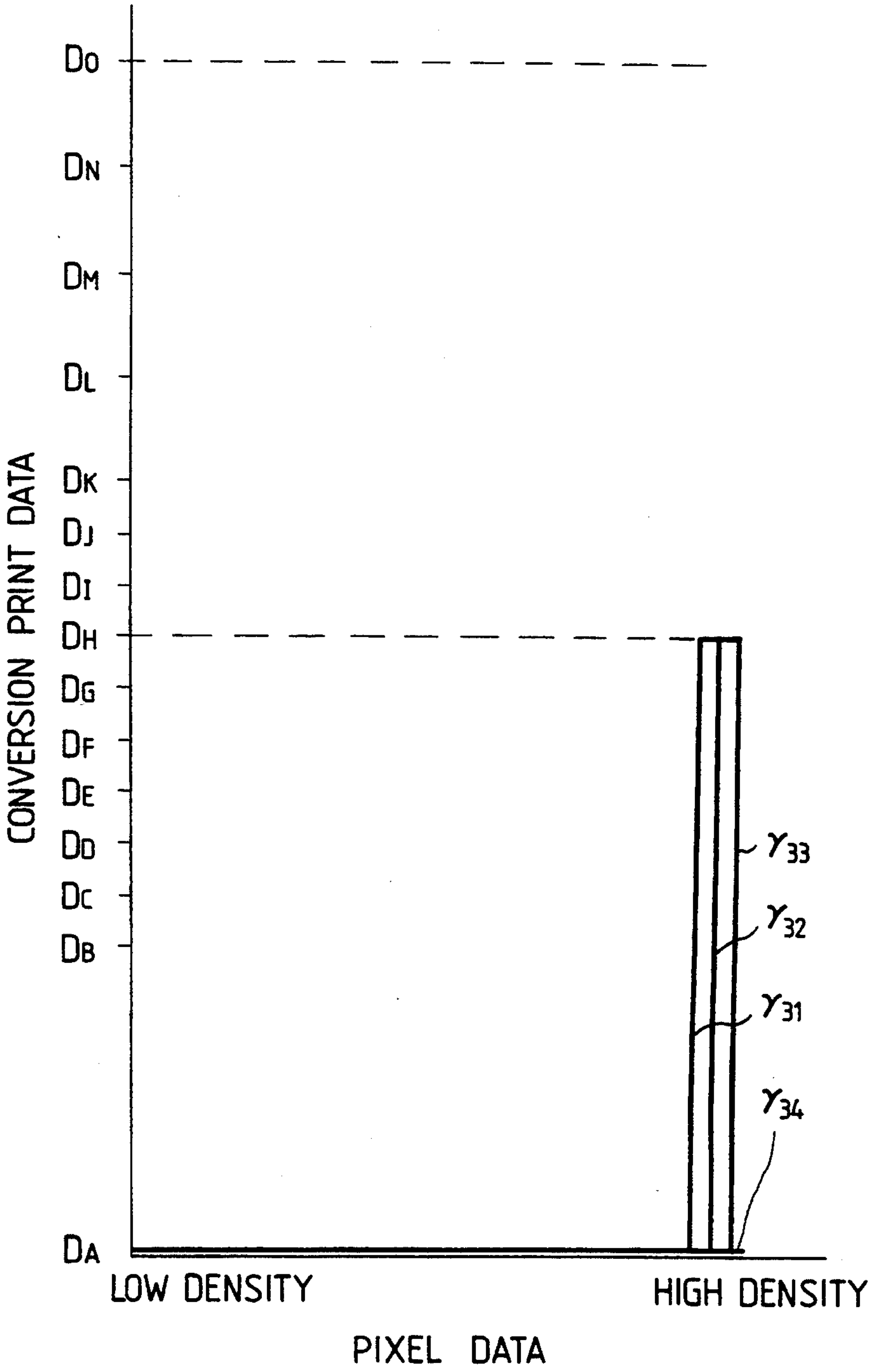

Each of the functions γ31 to γ34 in the third gamma characteristic conversion function group shown in FIG. 35 has a characteristic in which the density $D_H$ is generated only in the vicinity of the maximum density of pixel data. The functions are set so that conversion print data slightly different by a predetermined quantity for pixel data are taken.

Figure 36:
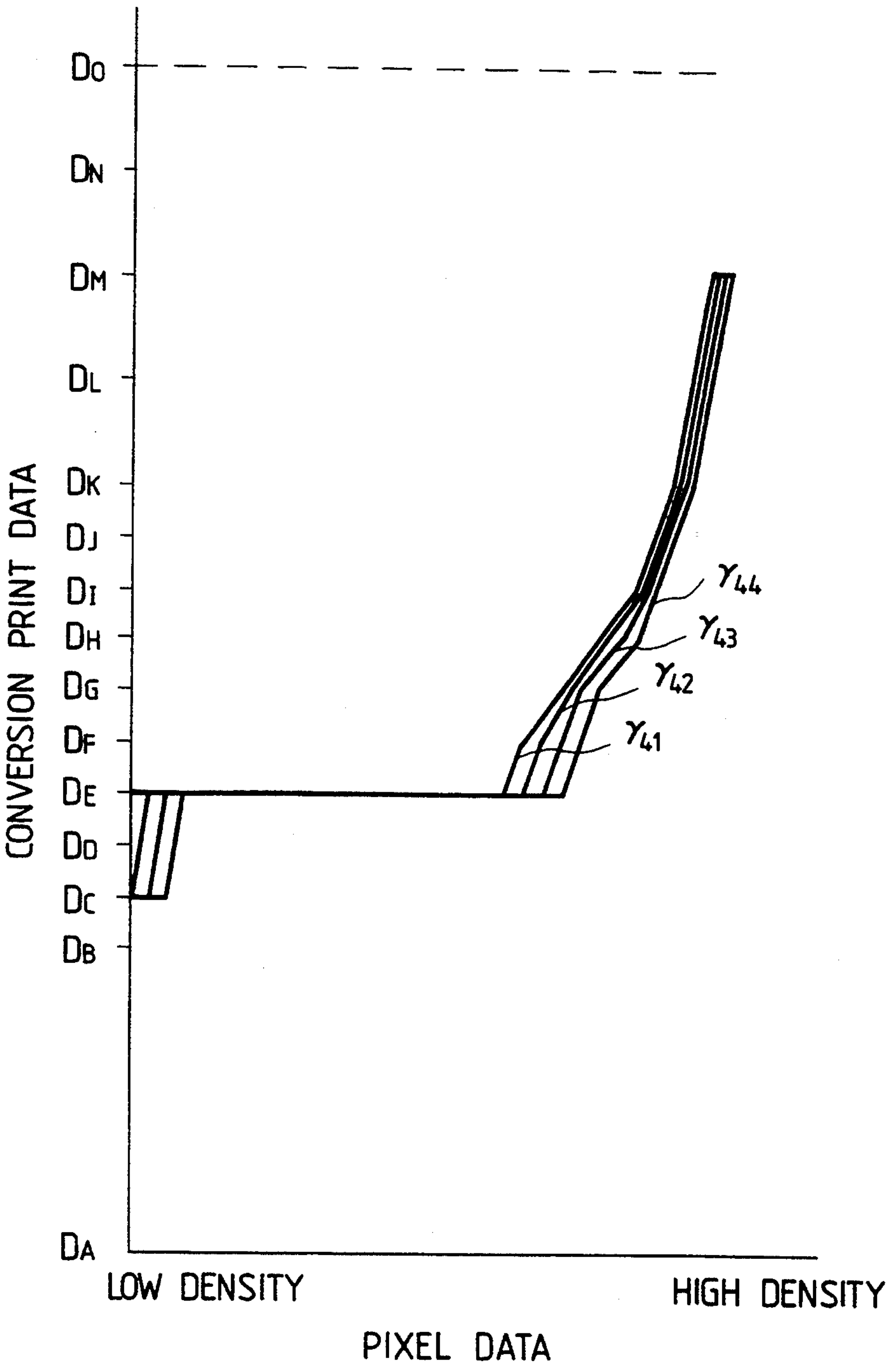

Each of the functions γ41 to γ44 in the fourth gamma characteristic conversion function group shown in FIG. 36 has a characteristic in which: the conversion print data $D_E$ for forming a minimum-size dot stably is kept constant in a range of from the low density region to the intermediate density region of pixel data; the conversion print data substantially proportionally increases to the conversion print data $D_M$ in a range of from the intermediate density region to the high density region of pixel data. The functions are set so that conversion print data slightly different by a predetermined quantity for pixel data are taken.

The operation of the apparatus having the aforementioned configuration will be described hereunder.

Description will be made, as an example, about the form of application as shown in FIG. 37, that is, the case where one function is selected from each of the first, second, third and fourth gamma characteristic conversion function groups by the conversion characteristic selection means 55 so that the selected functions are respectively assigned to the pixel data D11, D12, D21 and D22 in the matrix of 2×2 pixels sampled by the sampling means.

The pixel data D11 sampled by the sampling means 53 is converted into a conversion print data linearly proportional to the density thereof by one function γ11 of the first gamma characteristic conversion function group of the gamma conversion means 54 selected by the conversion characteristic selection means 55. The pixel data D12 is converted into a conversion print data by one function γ33 of the third gamma characteristic conversion function group so that dot forming energy is not applied except the case where the density $D_O$ is given when the density takes its maximum value. The pixel data D21 is converted into a conversion print data by one function γ34 of the third gamma characteristic conversion function group so that dot forming energy is not applied in all density regions. The pixel data D22 is converted into a conversion print data by one function γ21 of the second gamma characteristic conversion function group so that energy substantially sufficiently small to avoid dot forming is applied in the low density region and so that the convention print data is linearly proportional to the density of pixel data in the density region of not lower than the intermediate density region.

When the printing of the first-line pixel data is completed as described above, the pixel data D21 and D22 in the same sampling area are printed. Because the functions γ34 and γ21 are respectively assigned to the pixel data D21 and D22, the pixel data D22 is printed but the pixel data D21 is not printed in the intermediate density region. Because adjacent heating resistor elements are stopped also in the printing of the second-line pixel data, the pixel data as a subject of printing is formed as a dot having a density faithful to the density subjected to conversion by the function γ21. Thereafter, printing is continued while the form of assignment is alternated between the first and second lines through changing of image data as a subject of the gamma characteristic conversion function group shown in FIG. 37 in the form as shown in FIG. 38.

The form of application shown in FIG. 38 shows the case where basic 2×2 pixel data in FIG. 37 are arranged as a matrix of 4×4 pixels. The combination of pixel data D13, D14, D23 and D24, the combination of pixel data D31, D32, D41 and D42 and the combination of pixel data D33, D34, D43 and D44 are respectively equal in structure to the combination of pixel data D11, D12, D21 and D22. In each of the combinations of pixel data, pixel data are converted into conversion print data slightly different as shown in the drawing. The data D11, D13, D31 and D33 are assigned for functions γ11, γ12, γ13 and γ14 of the first gamma characteristic conversion function group shown in FIG. 33. The data D12, D14, D32 and D34 are assigned for functions γ31, γ32 and γ33 of the third gamma characteristic conversion function group shown in FIG. 35. The pixel data D21, D23, D41 and D43 are assigned for a function γ34 of the third gamma characteristic conversion function group shown in FIG. 35. The data D22, D24, D42 and D44 are assigned for functions γ21, γ22, γ23 and γ24 of the second gamma characteristic conversion function group shown in FIG. 34. As a result, with respect to the 16 pixels specified as a sampling area, the pixel data D11, D13, D31 and D33 are printed as main dots and the pixel data D22, D24, D42 and D44 are printed as subsidiary dots. Accordingly, the 16 pixel data D11 to D44 are expressed so that the main dots are covered with the subsidiary dots.

That is, in the case where the density of the area constituted by the thus sampled 16 pixels is low, dots corresponding to the pixel data D11, D13, D31 and D33 assigned for the first gamma characteristic conversion function group are printed (FIG. 39(I)). As the density of the sampled area increases, dots 60 corresponding to the pixel data D22, D24, D42 and D44 as signed for the second gamma characteristic conversion function group are also printed (FIG. 39(II)). As the density of pixel data increases further, the size of dots corresponding to the pixel data D11 and D22 increases so that an image is printed to narrow the island-like blank portions 61 (FIG. 39(III), 39(IV) and 39(V)). As the result of forming the island-like blank portions 61, ink of the area proportional to the density of image data is transferred to recording paper securely without wasteful peeling of ink from the ink sheet even in the case of printing of high-density data.

FIG. 40 shows a further form of conversion characteristics set by the conversion characteristic selection means 55. In FIG. 40, a function γ11 of the first gamma characteristic conversion function group, a function γ34 of the third gamma characteristic conversion function group, a function γ21 of the second gamma characteristic conversion function group and a function γ33 of the third gamma characteristic conversion function group are respectively assigned to the four pixel data D11, D12, D21 and D22 sampled by the sampling means 53. As a result, a dot corresponding to the pixel data D11 is formed preferentially and a dot corresponding to the pixel data D21 is formed as a subsidiary dot. When the aforementioned form is applied to a matrix of 4×4 pixels with gamma characteristic conversion functions changed slightly in the same manner as in the aforementioned embodiment while shifting the sampling area by one dot per two lines in the main scanning direction as shown in FIG. 41, dots corresponding to the pixel data D11, D13, D31 and D33 in the 4×4 matrix are formed in the case where the density of image data in the sampling area is low as shown in FIGS. 42(I) to 42(V). Further, the sampling area is shifted by one pixel as described above when the sampling area is moved by 2 lines in this density. Accordingly, subsidiary dots 62 are formed between the dots formed as the first-line pixel data. When printing is continued while repeating the aforementioned procedure, an angle connecting dots placed at the shortest distance, that is, a screen angle, takes a value of 63.4 degrees. FIGS. 43(*a*) and 43(*b*) show the case where four kinds of functions are suitably selected from the first, second, third and fourth gamma characteristic conversion function groups by the conversion characteristic selection means 54 so as to be assigned to 2×2 pixel data D11, D12, D21 and D22 in the matrix.

In a first form, a function γ41 of the fourth gamma characteristic conversion function group, a function γ11 of the first gamma characteristic conversion function group, a function γ33 of the third gamma characteristic conversion function group and a function γ34 of the third gamma characteristic conversion function group are respectively assigned to the pixel data D11, D12, D21 and D22 (FIG. 43(*a*)). In a second form, a function γ31 of the third gamma characteristic conversion function group, a function γ34 of the third gamma characteristic conversion function group, a function γ44 of the fourth gamma characteristic conversion function group and a function γ14 of the first gamma characteristic conversion function group are respectively assigned to the pixel data D13, D14, D23 and D24 (FIG. 43(*b*)). These first and second forms are used alternately while slightly changing the gamma characteristic conversion functions as shown in FIG. 44.

That is, when the first form is selected for the pixel data D11 to D44 in the first sampling area, a dot based on the pixel data D12 is printed preferentially. When the next pixel data adjacent to the sampling area are selected, the pixel data D24 is printed preferentially. As a result, dots at screen angles of ±26.6 degrees are formed in the low density region as shown in FIG. 45(I). When the image density of the sampling area increases, dots based on the fourth gamma characteristic conversion group as well as the dots based on the first gamma characteristic conversion function group are printed. As a result, the pixel data D12 and D11 are respectively printed as a main dot and as a subsidiary dot in each odd line, and the pixel data D24 and D23 are respectively printed as a main dot and as a subsidiary dot in each even line.

FIGS. 46(*a*) and 46(*b*) show other forms of conversion characteristics set by the conversion characteristic selection means 55. In a first form, a function γ11 of the first gamma characteristic conversion function group, a function γ33 of the third gamma characteristic conversion function group, a function γ34 of the third gamma characteristic conversion function group and a function γ21 of the second gamma characteristic conversion function group are respectively assigned to the pixel data D11, D12, D21 and D22 (FIG. 46(*a*)). In a second form, a function γ24 of the second gamma characteristic conversion function group, a function γ34 of the third gamma characteristic conversion function group, a function γ31 of the third gamma characteristic conversion function group and a function γ14 of the first gamma characteristic conversion function group are respectively assigned to the pixel data D13, D14, D23 and D24 (FIG. 46(*b*)). These first and second forms are used in the reverse order after two lines as shown in FIG. 47 and while slightly changing the gamma characteristic conversion functions.

In the aforementioned form of application, when the first form is selected for the four pixel data D11 to D22 in the first sampling area, a dot based on the pixel data D11 is printed preferentially. When the next pixel data adjacent to the pixel data are selected, the pixel data D22 is printed preferentially. As a result, dots at a screen angle of 45 degrees are formed in the low density region as shown in FIG. 48(I). When the image density of the sampling area increases, dots based on the second gamma characteristic conversion function group as well as the dots based on the first gamma characteristic conversion function group are printed. As a result, in each odd line, the pixel data D11 is formed as a main dot and the next pixel data D13 adjacent thereto is formed as a subsidiary dot with separation of one dot from the main dot. In every even line, the pixel data D24 is formed as a main dot and the pixel data D22 is formed as a subsidiary dot with separation of one dot from the main dot so as to be prior to the main dot.

FIGS. 49(a) and 49(b) show other forms of conversion characteristics set by the conversion characteristic selection means 55. In a first form, a function γ34 of the third gamma characteristic conversion function group, a function γ21 of the second gamma characteristic conversion function group, a function γ11 of the first gamma characteristic conversion function group and a function γ33 of the third gamma characteristic conversion function group are respectively assigned to the pixel data D11, D12, D21 and D22 (FIG. 49(a)). In a second form, a function γ31 of the third gamma characteristic conversion function group, a function γ14 of the first gamma characteristic conversion function group, a function γ24 of the second gamma characteristic conversion function group and a function γ34 of the third gamma characteristic conversion function group are respectively assigned to the pixel data D13, D14, D23 and D24 (FIG. 49(b)). These first and second forms are used in the reverse order after two lines as shown in FIG. 50 and while slightly changing the gamma characteristic conversion functions.

In the aforementioned form of application, when the first form is selected for the four pixel data D11 to D22 in the first sampling area, a dot based on the pixel data D21 is printed preferentially. When the next pixel data are selected, the pixel data D14 is printed preferentially. As a result, dots at a screen angle of 135 degrees are formed in the low density region as shown in FIG. 51(I). When the image density of the sampling area increases, dots based on the second gamma characteristic conversion function group as well as the dots based on the first gamma characteristic conversion function group are printed. As a result, in every odd line, the pixel data D14 is formed as a main dot and the prior pixel data D12 adjacent thereto is formed as a subsidiary dot with separation of one dot from the main dot. In every even line, the pixel data D21 is formed as a main dot and the pixel data D23 is formed as a subsidiary dot with separation of one dot from the main dot so as to be posterior to the main dot.

In the forms of application of gamma conversion characteristic functions as shown in FIGS. 37, 40, 43(a) and 43(b) among the aforementioned embodiments, blank portions are formed substantially circularly and separately so that ink for non-dot forming portions can be prevented from peeling wastefully. As a result, a gradation faithful to the density of pixel data can be expressed.

Figure 52:
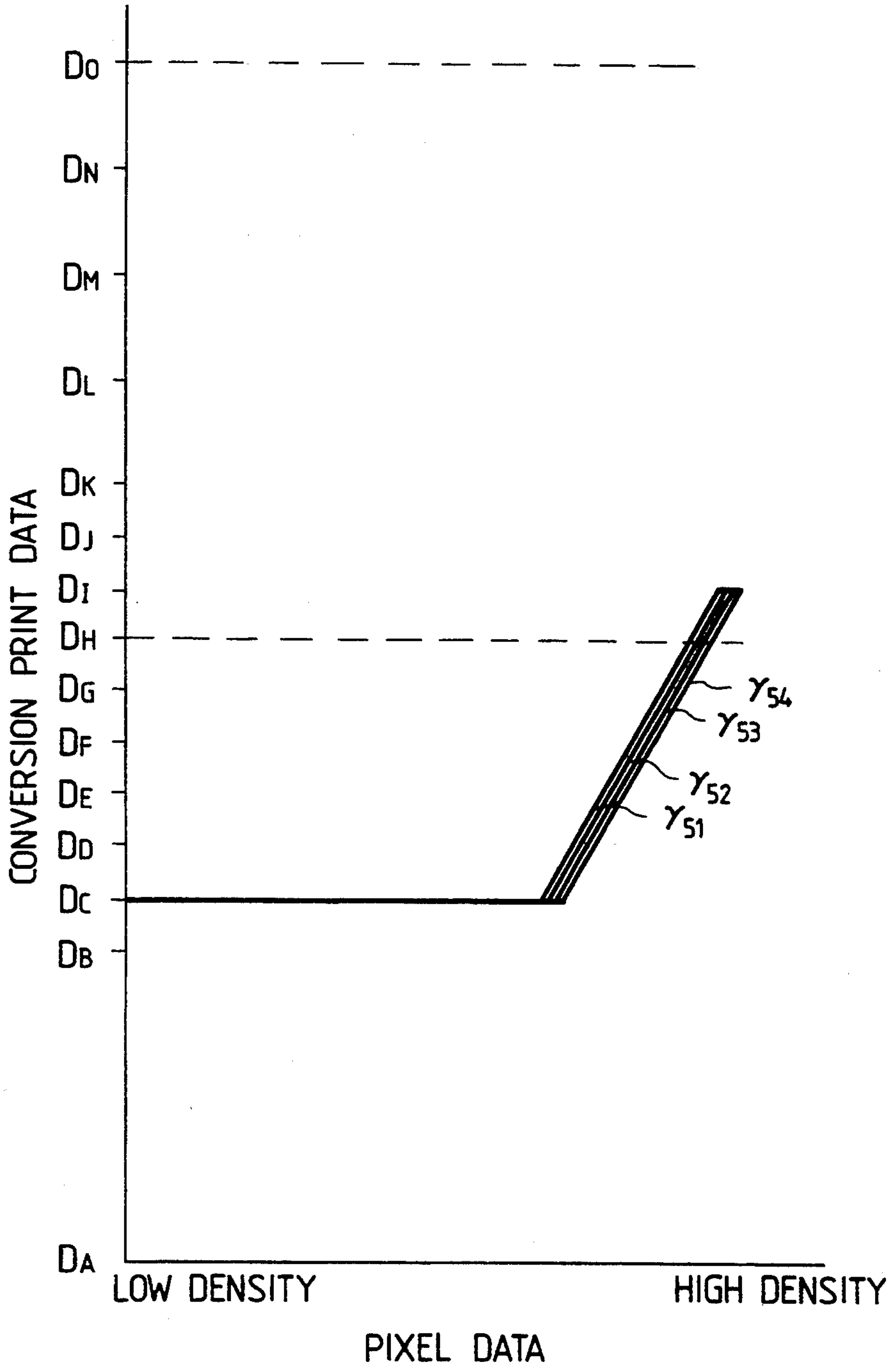
FIGS. 52 and 53 are graphs respectively showing further examples of the gamma characteristic conversion function groups.

FIG. 52 shows an example of a function group used instead of the aforementioned second gamma characteristic conversion function group. The function group is constituted by gamma characteristic conversion functions γ51 to γ54. Each of the functions has a characteristic in which: a conversion print data $D_C$ is kept constant to form no dot in a range of from the low density region to the intermediate density region of pixel data; and the conversion print data proportionally increases to a conversion print data $D_I$ in a range of from the intermediate density region to the high density region of pixel data.

Figure 53:
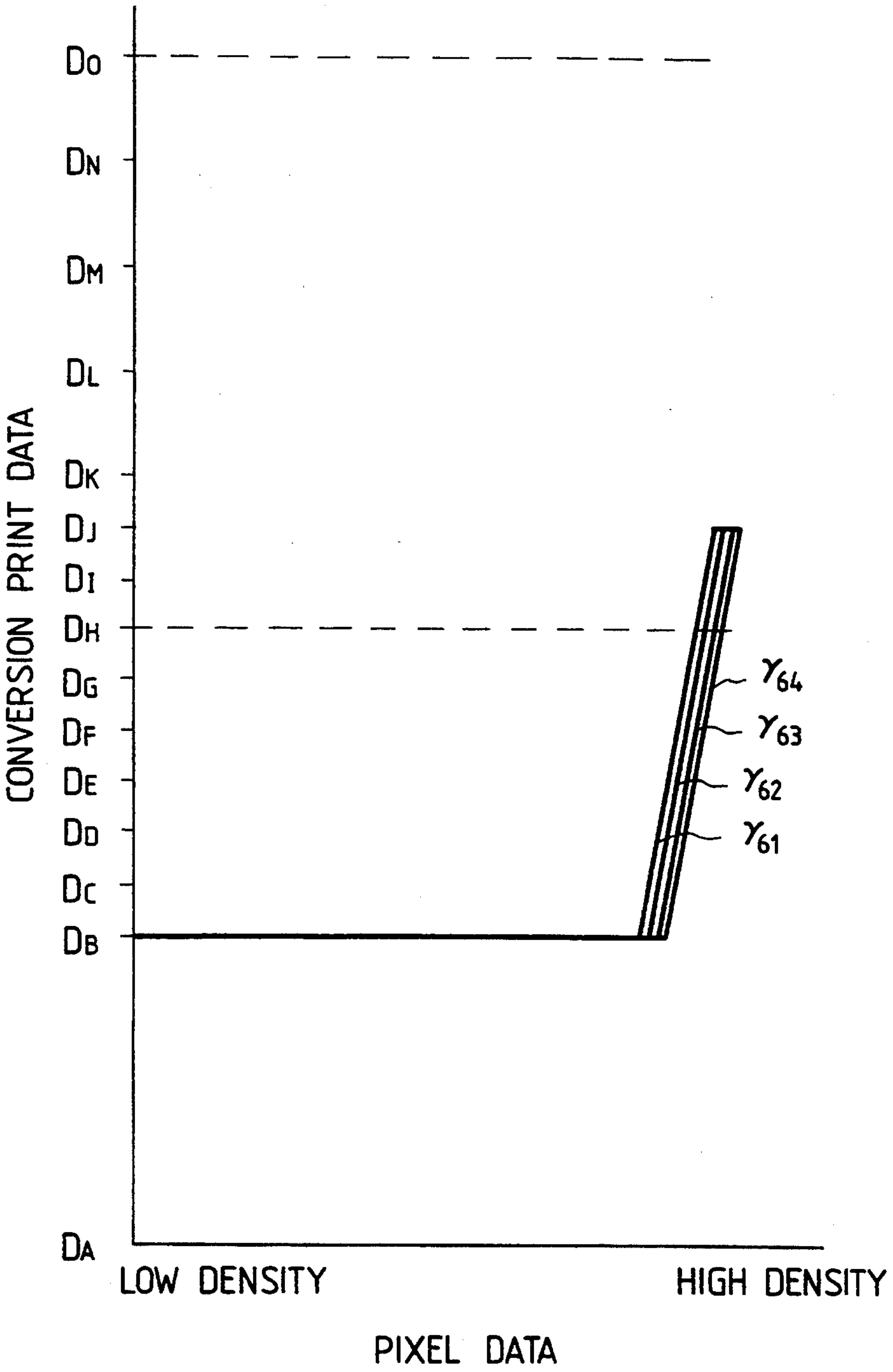

FIG. 53 shows a sixth gamma characteristic conversion function group γ61 to γ66 used instead of the aforementioned fourth gamma characteristic conversion function group. Each of the functions in the sixth group has a characteristic in which: a conversion print data $D_C$ is kept constant to forth no dot in a range of from the low density region to the intermediate density region of pixel data; and the conversion print data increases to a conversion print data $D_J$ in the high density region of pixel data. The functions are set to conversion print data which are slightly different by a predetermined quantity for pixel data.

FIG. 54 shows a printing form in the case where the fifth and sixth function groups shown in FIGS. 52 and 53 are used. That is, FIG. 54 shows an example of the form of application in the case where four kinds of functions suitably selected from the first, third, fifth (FIG. 52) and sixth (FIG. 53) gamma characteristic conversion function groups by the conversion characteristic selection means 55 are assigned to pixel data D11, D12, D21 and D22 in the matrix of 2×2 pixels selected by the sampling means.

That is, the pixel data D11 sampled by the sampling means 53 is converted into a conversion print data linearly proportional to the density thereof by one function γ11 of the gamma characteristic conversion function group of the gamma conversion means 54 selected by the conversion characteristic selection means 55. The pixel data D12 is converted into a conversion print data by one function γ64 of the sixth gamma characteristic conversion function group so that a conversion print data $D_B$ is kept constant to form no dot in a range of from the low density region to the intermediate density region of pixel data and then changed to a conversion print data $D_J$ in a range of from the intermediate density region to the high density region of pixel data. Further, the pixel data D21 is converted into a conversion print data by one function γ51 of the fifth gamma characteristic conversion function group so that a conversion print data $D_C$ is kept constant to form no dot in a range of from the low density region to the intermediate density region of pixel data and then changed to a conversion print data $D_I$ in a range of from the intermediate density region to the high density region of pixel data. Further, the pixel data D22 is converted into a conversion print data by one function γ34 of the third gamma characteristic conversion function group so that energy is not applied in the all regions.

As a result, when the first-line pixel data D11 and D12 are printed, a dot corresponding to the pixel data D11 is formed for pixel data of intermediate density appearing frequently in an ordinary image but the adjacent pixel data D12 serves to cover the pixel data D11. When the printing of the first-line pixel data is completed as described above, the pixel data D21 and D22 in the same sampling area are printed. Because the functions γ51 and γ34 are respectively assigned to the pixel data D21 and D22, the pixel data D21 alone serves to cover the first-line pixel data D11.

Thereafter, printing is continued in the form as shown in FIG. 55, that is, by alternately repeating the form of assignment of gamma characteristic conversion functions while slightly changing the gamma characteristic conversion functions shown in FIG. 54.

When the density of pixel data in the sampling area is low, dots based on the pixel data D11, D13, D31 and D33 are formed. As a result, dots are formed like checkers as shown in FIG. 56(I), so that screen angles of 0 and 90 degrees are set. When the density of pixel data increases, dots based on the fifth and sixth gamma characteristic conversion function groups are formed as shown in FIG. 56(III). Because not only the dots based on the fifth and sixth gamma characteristic conversion function groups are small but the pixel data D21 are not used for forming dots except the maximum density of pixel data, dots are formed while forming one-dot circular blank portions 65. As a result, ink in the blank portions is prevented from peeling wastefully widely, so that dots of a gradation faithful to the density of pixel data can be formed.

Although the case where the first, second, fifth and sixth gamma characteristic conversion function groups are continuously applied to pixel data has been described with reference to FIG. 55, it is a matter of course that this embodiment can be applied to the forms as shown in FIGS. 38, 41, 44, 47 and 50.

Because the gamma conversion means has the aforementioned characteristics, the first, second and third gamma characteristic conversion function groups can be assigned to respective pixels in the sampled matrix data so that the sampling area can be expressed not only through generation of a main dot as a center of image expression and a subsidiary dot adjacent to the main dot on the basis of the first and second gamma characteristic conversion function groups but through addition of a dot based on the third gamma characteristic conversion function group thereto for the maximum density of pixel data.

The gamma conversion characteristics can be selected by the head density correction data 37 to correct the densities outputted from the respective heating resistor elements 14 of the thermal transfer recording head 6 or may be selected by the thermal history correction data 38 to correct the thermal interference through the printing history.

Figure 57:
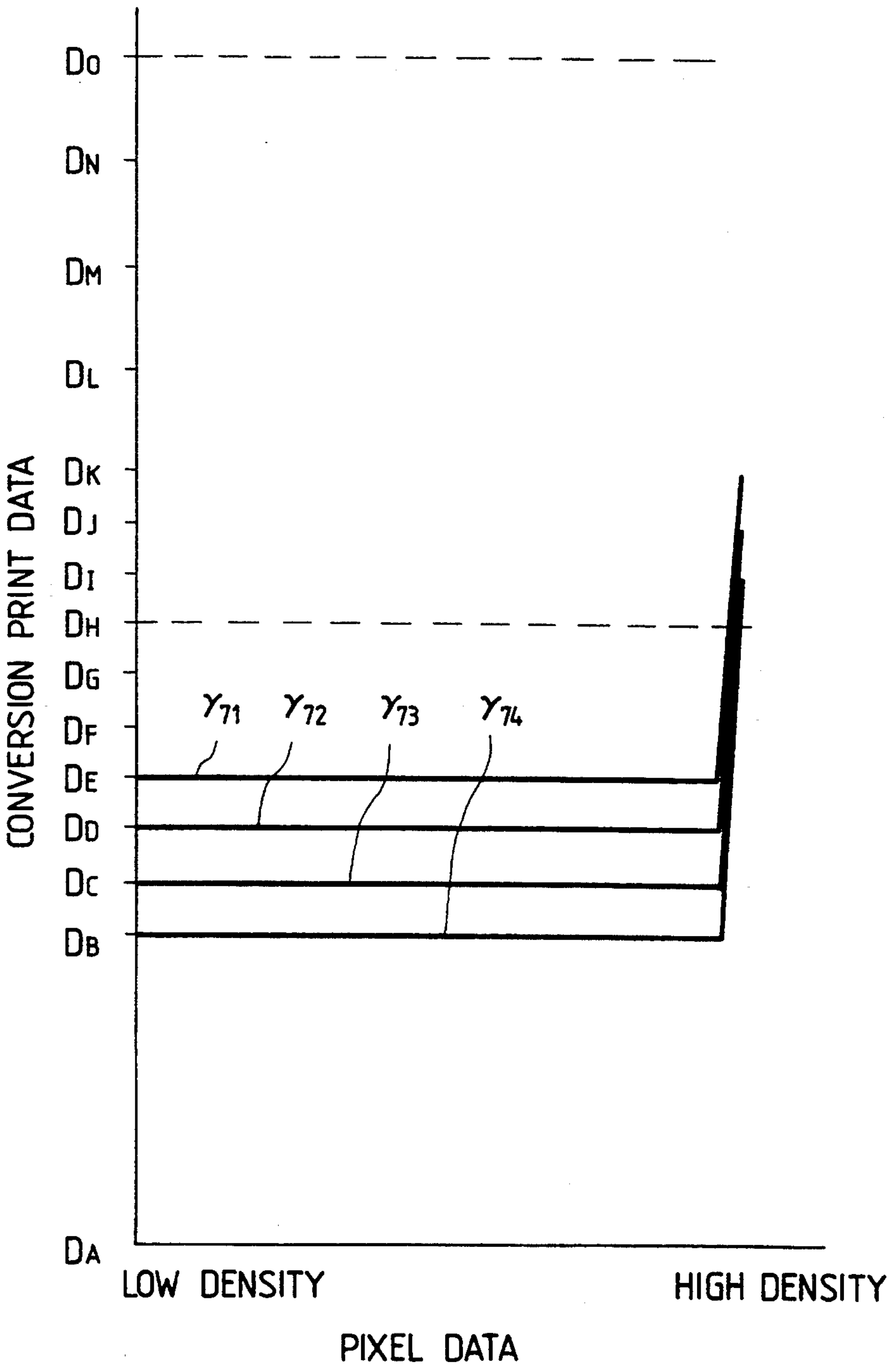
FIG. 57 is a graph showing an example of the gamma function groups adapted for correction of the thermal history of the substrate as a constituent member of the recording head.

FIG. 57 shows a seventh gamma characteristic conversion function group adapted for correction of the thermal history. In this embodiment, the seventh gamma characteristic conversion function group is constituted by functions γ71 to γ74. Each of the functions has a characteristic in which: a conversion print data $D_B$, $D_C$, $D_D$ or $D_E$ sufficiently small to form no dot or to form a minimum-size dot is kept constant in a range of from the low density region to the high density region of pixel data; and the data increases to a conversion print data $D_I$, $D_J$ or $D_K$ in the maximum density region.

Figure 58:
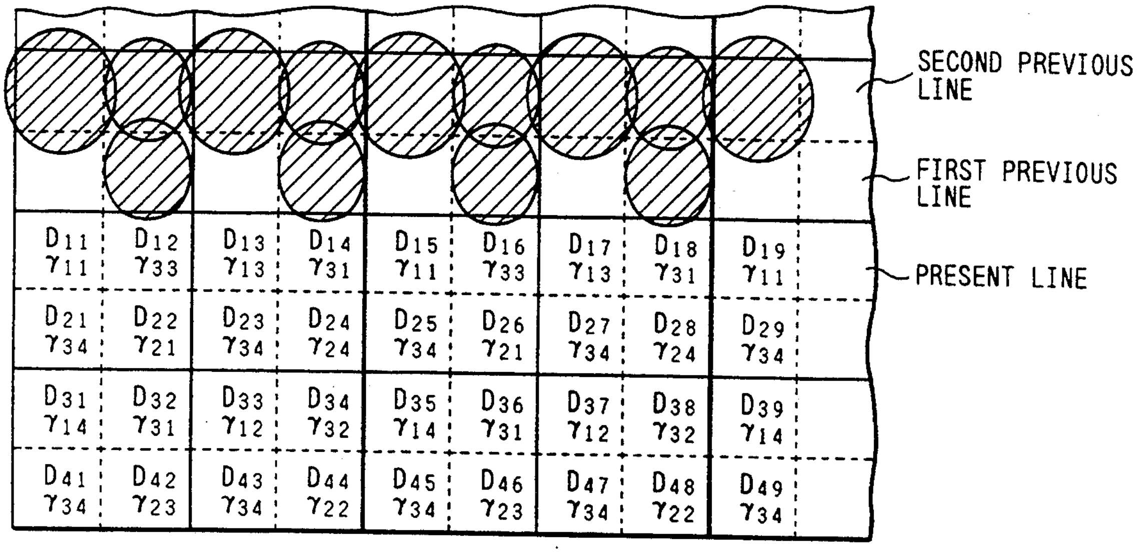

FIG. 58 shows the case where dots are printed for every second column in the first previous line with respect to a certain line in the paper feeding direction and all dots are printed in the second previous line with respect to the certain line. In this case, the pixel data D12, D14, (D16 and D18) are assigned for the third gamma characteristic conversion group shown in FIG. 35.

Figure 59:
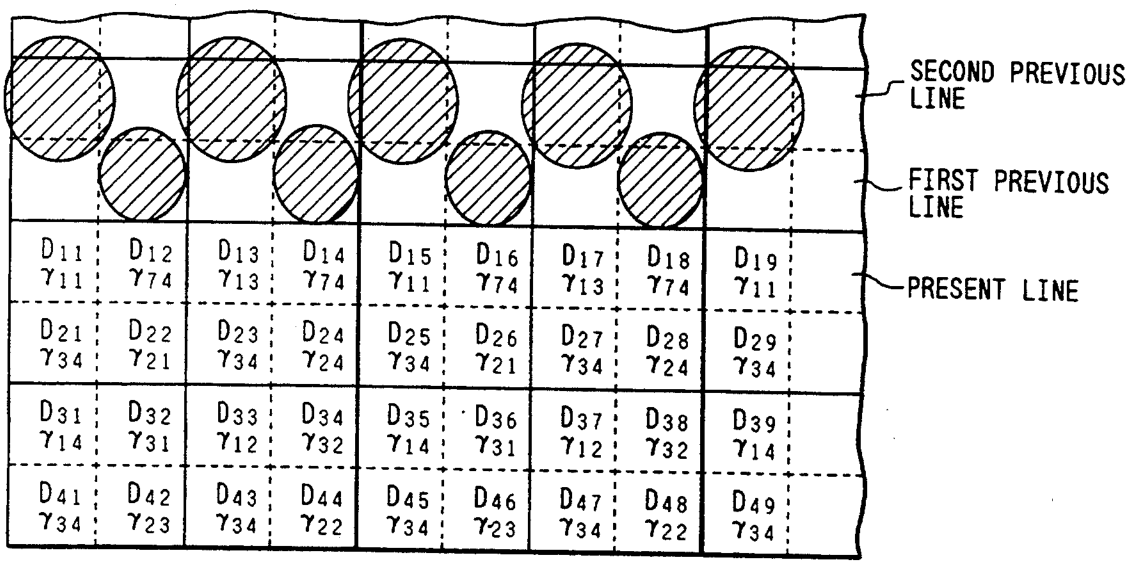

FIG. 59 shows the case where dots are printed for every second column in the first preceding line with respect to a certain line in the paper feeding direction and dots are also printed for every second column line in the second preceding line with respect to the certain line so that column positions of dots are different between the first preceding line and the second preceding line. In this case, the pixel data D12, D14, (D16 and D18) are assigned for one function γ74 of the seventh gamma characteristic function group shown in FIG. 57, which serves to convert the data into a slightly higher conversion print data compared with the third gamma characteristic conversion group shown in FIG. 35. FIG. 60 shows the case where dots are printed for every second column in the first preceding line with respect to a certain line in the paper feeding direction and no dot is printed in the second preceding line with respect to the certain line. In this case, the pixel data D12, D14, (D16 and D18) are assigned for one function γ73 higher by one gradation level than the function γ74 of the seventh gamma characteristic function group. FIG. 61 shows the case where no dot is printed in the first preceding line with respect to a certain line in the paper feeding direction and dots are printed for every second column in the second preceding line with respect to the certain line. In this case, the pixel data D12, D14, (D16 and D18) are assigned for one function γ72 higher by one gradation level than the function γ73 of the seventh gamma characteristic function group. FIG. 62 shows the case where no dot is printed in the first preceding line with respect to a certain line in the paper feeding direction and no dot is printed in the second preceding line with respect to the certain line. In this case, the pixel data D12, D14, (D16 and D18) are assigned for one function γ71 higher by one gradation level than the function γ72 of the seventh gamma characteristic function group.

By suitably selecting the functions γ71 to γ74 constituting the seventh gamma characteristic conversion function group on the basis of the density correction data storage means 56 and the thermal history correction data storage means 57, the functions γ71 to γ74 of the seventh gamma characteristic conversion function group to form no dot in a large part of the range can be used for correcting the print density on the basis of the change of the temperature of the substrate 13 (FIG. 3) and the change of the environmental temperature caused by the continuous printing operation. Accordingly, sharp color printing being always stable can be performed regardless of the great change of the printing density. The aforementioned correction can be made easily by selection of data, so that no arithmetic operation circuit is required for correcting the thermal history. As a result, the structure of the apparatus can be simplified.

What is claimed is:

1. A thermal transfer image forming apparatus comprising:

a recording head having a plurality of heating resistor elements arranged in a line for recording images on recording paper;

means for carrying a sheet of said recording paper and an ink sheet at a predetermined pitch past said recording head;

image data reading means for continuously reading pixel data of N lines constituting input image data, where N is an integer $\geq 2$;

sampling means for sampling said pixel data of N lines into a matrix of N×N pixels, wherein said pixel data varies in density;

gamma conversion means for converting said pixel data associated with each of said pixels in said matrix into output print data, said gamma conversion means having a first gamma characteristic conversion function for outputting print data which forms main dots by performing gamma conversion proportionally in a pixel data density range of from a low density to a high density, a second gamma characteristic conversion function for outputting print data being lower in density than said first gamma characteristic conversion function for forming subsidiary dots, and third and fourth gamma characteristic conversion functions for outputting print data to form no dot in a large part of said density range, thereby expressing pixel density as a dot size for each of the N×N pixels;

conversion characteristic selection means for assigning the gamma characteristic conversion functions to the sampled N×N pixels to arrange dots based on the first gamma characteristic conversion function at a predetermined angle; and means for supplying electric energy corresponding to the print data to the heating resistor elements of the recording head so that images are recorded on said recording paper by forming said dots in accordance with said print data.

2. A thermal transfer image forming apparatus according to claim 1, in which said conversion characteristic selection means has a selection characteristic which is set to change the angle of arrangement of dots correspondingly to each primary color.

3. A thermal transfer image forming apparatus according to claim 1, in which said conversion characteristic selection means has a selection characteristic which is set to combine adjacent two dots in a main scanning direction in a range of from a low density to an intermediate density and arrange the two dots in a predetermined direction.

4. A thermal transfer image forming apparatus according to claim 1, in which said conversion characteristic selection means has a selection characteristic which is set to combine adjacent two dots in a subsidiary scanning direction in a range of from a low density to an intermediate density and arrange the two dots in a predetermined direction.

5. A thermal transfer image forming apparatus comprising:

a recording head having a plurality of heating resistor elements arranged in a line for recording images on recording paper;

means for carrying a sheet of recording paper and an ink sheet at a predetermined pitch past said recording head;

image data reading means for continuously reading pixel data of N lines constituting input image data wherein N is an integer$\geqq$2;

sampling means for sampling said pixel data into a matrix of N×N pixels wherein said pixel data varies in density;

gamma conversion means for converting said pixel data associated with each of said pixels in said matrix into output print data, said gamma conversion means having a first gamma characteristic conversion function group for outputting print data which forms main dots by performing gamma conversion proportionally in a range of from a low density to a high density of pixel data, second and third gamma characteristic conversion function groups for outputting print data for forming dots by performing gamma conversion proportionally increasing in density in a range of from an intermediate density to the high density of pixel data, and a fourth gamma characteristic conversion function group for outputting print data to form no dot in a large part of the range, to express pixel density as dot size for each of said N×N pixels;

conversion characteristic selection means for assigning said gamma characteristic conversion function groups to arrange dots based on said first gamma characteristic conversion function group at a predetermined angle; and means for supplying electric energy corresponding to said print data to said heating resistor elements of said recording head so that images are recorded on said recording paper by forming said dots in accordance with said print data.

6. A thermal transfer image forming apparatus according to claim 5, in which said conversion characteristic selection means has a selection characteristic which is set to change the angle of arrangement of dots correspondingly to each primary color.

7. A thermal transfer image forming apparatus according to claim 5, in which said conversion characteristic selection means has a selection characteristic which is set to combine adjacent two dots in the main scanning direction in a range of from a low density to an intermediate density and arrange the two dots in a predetermined direction.

8. A thermal transfer image forming apparatus according to claim 5, in which said conversion characteristic selection means has a selection characteristic which is set to combine adjacent two dots in the subsidiary scanning direction in a range of from a low density to an intermediate density and arrange the two dots in a predetermined direction.

9. A thermal transfer image forming apparatus according to claim 5, in which functions constituting said third gamma characteristic conversion function group are respectively sufficiently small to form no dot in a range of from a low density to a high density of pixel data and are different in the value of conversion print data, so that the functions are selected correspondingly to the environmental temperature or the temperature of the recording head substrate.

* * * * *